United States Patent
Nilsen et al.

(10) Patent No.: US 6,891,677 B2
(45) Date of Patent: May 10, 2005

(54) SUBWAVELENGTH OPTICAL MICROSTRUCTURE LIGHT-REDIRECTING FILMS

(75) Inventors: Robert B. Nilsen, Weatogue, CT (US); Patrick W. Mullen, Barkhamsted, CT (US); Xiao-Jing Lu, Bloomfield, CT (US)

(73) Assignee: Reflexite Corporation, Avon, CT (US)

(*) Notice: Subject to any disclaimer, the term of this patent is extended or adjusted under 35 U.S.C. 154(b) by 0 days.

(21) Appl. No.: 10/445,375

(22) Filed: May 23, 2003

(65) Prior Publication Data

US 2004/0027676 A1 Feb. 12, 2004

Related U.S. Application Data

(63) Continuation-in-part of application No. 09/684,455, filed on Oct. 6, 2000, now Pat. No. 6,570,710, which is a continuation-in-part of application No. 09/438,912, filed on Nov. 12, 1999, now Pat. No. 6,356,389.

(51) Int. Cl.[7] .......................... G02B 27/10; G02B 5/18; G02B 6/00
(52) U.S. Cl. .................... 359/625; 359/569; 385/133
(58) Field of Search ................. 359/625, 566, 359/569, 251, 619; 385/133, 146; 362/30, 31, 97, 331

(56) References Cited

U.S. PATENT DOCUMENTS

| | | |
|---|---|---|
| 2,218,227 A | 10/1940 | Winnek |
| 2,232,551 A | 2/1941 | Merton |
| 2,248,638 A | 7/1941 | Merton |
| 2,310,790 A | 2/1943 | Jungersen |
| 2,474,317 A | 6/1949 | McPhail |
| 3,234,376 A | 2/1966 | Ceglia |
| 3,288,990 A | 11/1966 | Stahlhut |
| 3,846,012 A | 11/1974 | Brown |
| 3,908,056 A | 9/1975 | Anderson |
| 4,013,465 A | 3/1977 | Clapham et al. |

(Continued)

FOREIGN PATENT DOCUMENTS

| | | |
|---|---|---|
| EP | 0 414 313 A1 | * 2/1991 |
| EP | 0 685 681 A2 | * 12/1995 |
| FR | 2049387 | 3/1971 |
| GB | 1 529 021 | * 10/1978 |
| GB | 198 279 | * 6/1988 |

(Continued)

OTHER PUBLICATIONS

Wilson et al., "The Optical Properties of 'Moth Eye' Antireflection Surfaces," *Optica Acta*, 29(7):993–1009 (1982).

(Continued)

*Primary Examiner*—Georgia Epps
*Assistant Examiner*—M. Hasan
(74) *Attorney, Agent, or Firm*—Hamilton, Brook, Smith & Reynolds, P.C.

(57) ABSTRACT

A waveguide for use in a back lighting device includes a moth-eye structured surface. A back lighting system includes a lighting device, a display panel, and a waveguide for redirecting light generated by the light source toward the display panel. A first light-redirecting film, which can include a plurality of moth-eye structures, can be positioned between the waveguide and the display panel. The first light-redirecting film can also include a plurality of linear prisms. A second light-redirecting film is also provided that can include a plurality of moth-eye structures and a plurality of linear prisms. The second light-redirecting film can be positioned between the first light-redirecting film and the display panel. A diffuser can be positioned between the first light-redirecting film and the waveguide and/or between the second light-redirecting film and the display panel.

41 Claims, 23 Drawing Sheets

U.S. PATENT DOCUMENTS

| | | | |
|---|---|---|---|
| 4,064,433 A | | 12/1977 | Korn |
| 4,114,983 A | | 9/1978 | Maffitt et al. |
| 4,120,565 A | | 10/1978 | Rabl et al. |
| 4,154,219 A | | 5/1979 | Gupta et al. |
| 4,233,651 A | | 11/1980 | Fabbri |
| 4,242,723 A | | 12/1980 | Fabbri et al. |
| 4,260,220 A | | 4/1981 | Whitehead |
| 4,340,276 A | | 7/1982 | Maffitt et al. |
| 4,414,316 A | | 11/1983 | Conley |
| 4,420,502 A | | 12/1983 | Conley |
| 4,497,860 A | | 2/1985 | Brady, Jr. |
| 4,542,449 A | | 9/1985 | Whitehead |
| 4,576,850 A | | 3/1986 | Martens |
| 4,615,579 A | | 10/1986 | Whitehead |
| 4,668,558 A | | 5/1987 | Barber |
| 4,750,798 A | * | 6/1988 | Whitehead |
| 4,787,708 A | | 11/1988 | Whitehead |
| 4,805,984 A | | 2/1989 | Cobb, Jr. |
| 4,883,341 A | | 11/1989 | Whitehead |
| 4,906,070 A | | 3/1990 | Cobb, Jr. |
| 5,056,892 A | | 10/1991 | Cobb, Jr. |
| 5,079,675 A | * | 1/1992 | Nakayama |
| 5,126,882 A | | 6/1992 | Oe et al. |
| 5,177,637 A | | 1/1993 | Tsukada |
| 5,183,597 A | | 2/1993 | Lu |
| 5,186,530 A | | 2/1993 | Whitehead |
| 5,339,179 A | * | 8/1994 | Rudisill et al. |
| 5,396,350 A | * | 3/1995 | Beeson et al. |
| 5,550,676 A | * | 8/1996 | Ohe et al. .................. 359/599 |
| 5,581,605 A | | 12/1996 | Murakami et al. |
| 5,592,332 A | | 1/1997 | Nishio et al. |
| 5,600,462 A | | 2/1997 | Suzuki et al. |
| 5,629,784 A | * | 5/1997 | Abileah et al. |
| 5,629,796 A | | 5/1997 | Shanks |
| 5,644,431 A | | 7/1997 | Magee |
| 5,694,246 A | | 12/1997 | Aoyama et al. |
| 5,716,681 A | | 2/1998 | Williams |
| 5,760,960 A | | 6/1998 | Lin et al. |
| 5,771,328 A | | 6/1998 | Wortman et al. |
| 5,779,337 A | | 7/1998 | Saito et al. |
| 5,812,319 A | * | 9/1998 | Sonstroem .................. 359/569 |
| 5,838,404 A | | 11/1998 | Ozeki et al. |
| 5,844,720 A | | 12/1998 | Ohara et al. |
| 5,851,062 A | * | 12/1998 | Shinohara et al. |
| 5,854,872 A | | 12/1998 | Tai |
| 5,917,664 A | * | 6/1999 | O'Neill et al. |
| 5,919,551 A | | 7/1999 | Cobb, Jr. et al. |
| 5,940,149 A | | 8/1999 | Vanderwerf |
| 5,944,405 A | | 8/1999 | Takeuchi et al. |
| 5,947,578 A | * | 9/1999 | Ayres .......................... 362/31 |
| 5,971,559 A | * | 10/1999 | Ishikawa et al. |
| 5,999,685 A | | 12/1999 | Goto et al. |
| 6,049,649 A | | 4/2000 | Arai |
| 6,104,854 A | | 8/2000 | Masaki et al. |
| 6,151,166 A | * | 11/2000 | Matsushita et al. ......... 359/566 |
| 6,164,799 A | * | 12/2000 | Hirmer et al. |
| 2004/0190102 A1 | * | 9/2004 | Mullen et al. ............... 359/237 |

FOREIGN PATENT DOCUMENTS

| | | | |
|---|---|---|---|
| TW | | 289802 | 11/1996 |
| TW | | 325524 | 1/1998 |
| TW | | 331593 | 5/1998 |
| WO | WO 00/52527 | * | 9/1900 |
| WO | WO 96/10148 | * | 4/1996 |
| WO | WO 97/28468 | * | 8/1997 |
| WO | WO 98/33006 | * | 7/1998 |
| WO | WO 98/50805 | * | 11/1998 |
| WO | WO 99/50691 | * | 10/1999 |
| WO | WO 01/27663 A1 | | 4/2001 |

OTHER PUBLICATIONS

Clapham et al., "Reduction of Lens Reflection by the "Moth Eye" Principle," *Nature,* 244:281–282 (1973).

Bernhard, "Structural and Functional Adaptation in a Visual System," *Endeavor,* 26:79–84 (1967).

Warren, W., "Screen Savers," LD+A (Lighting Design+ Application), pp. 39–41 (Feb. 2000).

* cited by examiner

LUMINANCE CROSS SECTION AT 90.0°
95° PRISMS WITH MOTH EYE

LUMINANCE CROSS SECTION AT 0,0°
95° PRISMS WITHOUT MOTH EYE

SUBWAVELENGTH OPTICAL MICROSTRUCTURE LIGHT-REDIRECTING FILMS

RELATED APPLICATIONS

This application is a Continuation-in-Part application of U.S. patent application Ser. No. 09/684,455, filed Oct. 6, 2000 (now U.S. Pat. No. 6,570,710), which is a Continuation-in-Part application of U.S. patent application Ser. No. 09/438,912, filed Nov. 12, 1999 (now U.S. Pat. No. 6,356,389). The entire teachings of the above applications are incorporated herein by reference.

BACKGROUND OF THE INVENTION

Brightness enhancing films (BEF) have been used in lighting panels for directing light from lighting fixtures through luminaires and laptop computers displays. The brightness enhancing films, which can have linear prisms, diffuse light with a desired directionality. Often the films have been used in combination with a fluorescent light source. The films have had partial success in improving luminaire or display brightness by controlling the angle at which light emerges. However, a need still exists for improved control of lighting and enhancement of brightness for laptop computer screens.

SUMMARY OF THE INVENTION

The present invention includes a light-redirecting or collimating film having a sheeting having a first side and a second side, wherein the first side includes a series of linear optical elements having a primary axis running the length of the optical elements, and the second side includes a plurality of subwavelength structures being oriented at about 90 degrees relative to the primary axis of the linear optical elements. The subwavelength structures can include linear moth-eye structures. In one embodiment, the linear optical elements are linear prisms having an included angle in the range of between about 60 and 120 degrees. In another embodiment, the linear optical elements include lenticular linear elements. In a particular embodiment, the prisms have an included angle of about 88 degrees. In another particular embodiment, the prisms have an included angle of about 89 degrees.

In another embodiment, the invention includes a back lighting display device having a lighting device, a display panel, and a sheeting having a first side and a second side, wherein the first side includes a series of linear prisms having peaks, and the second side includes a plurality of subwavelength structures, the subwavelength structures being oriented at about 90 degrees relative to the peaks of the linear prisms.

In a further embodiment, the invention includes an optical structure having a first light-redirecting film having a first surface with a plurality of linear moth-eye structures thereon and a second surface with first linear prisms having peaks, the linear moth-eye structures being about parallel or perpendicular to the peaks of the first linear prisms. The optical structure can also include a second light-redirecting film having a first surface with a plurality of linear moth-eye structures thereon and a second surface with second linear prisms having peaks, the linear moth-eye structures being about parallel or perpendicular to the peaks of the second linear prisms.

In particular embodiments, a diffuser can be provided between the first light-redirecting film and the waveguide and/or a diffuser can be positioned between the second light-redirecting film and the display panel.

A method of forming a light-redirecting film is also provided that includes the steps of forming a series of linear prisms, which include peaks, on a first side of a sheeting, and forming a plurality of linear moth-eye structures on a second side of the sheeting with the linear moth-eye structures being oriented at about 90 degrees relative to the peaks of the linear prisms. The method can further include the steps of forming a series of linear prisms, which also include peaks, on a first side of a second sheeting, and forming a plurality of linear moth-eye structures on a second side of the second sheeting with the linear moth-eye structures being oriented at about 90 degrees relative to the peaks of the linear prisms. In one embodiment, the first and second sheetings are arranged such that the moth-eye structures of the first sheeting face the moth-eye structures of the second sheeting.

Figure 1:
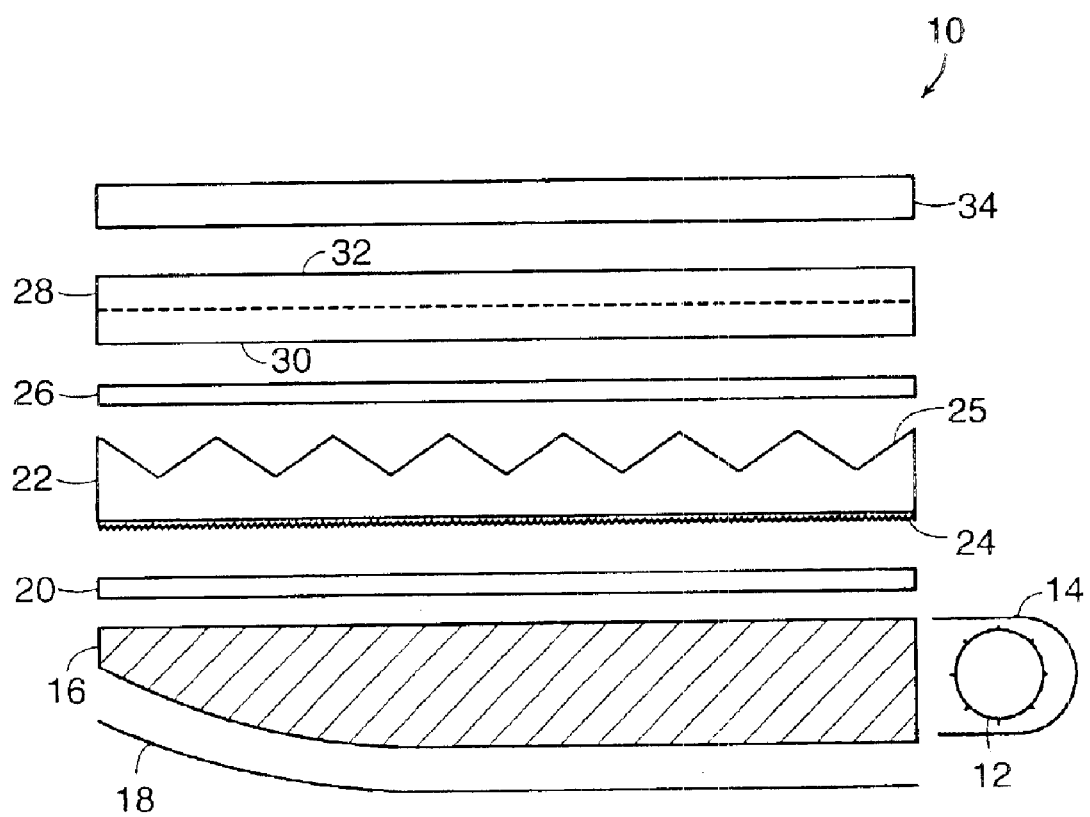
FIG. 1 illustrates a cross-sectional view of a backlighting system.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. All percentages and parts are by weight unless otherwise indicated.

DETAILED DESCRIPTION OF THE INVENTION

With respect to the optical performance of a light-redirecting or collimating film, it has been found that for individual AMLCD (active matrix liquid crystal display) back lighting system designs, the optical efficiency of the particular lamp, waveguide, and diffuser system can be improved by designing a light-redirecting film to maximize the use of the diffraction and refraction effects. For example, as shown in FIG. 1, a back lighting system 10 includes a light source 12 and light reflector 14. Light source 12 can be a fluorescent light, incandescent light or other suitable light source. Waveguide 16, which is for directing light out of back lighting system, can be formed of a transparent solid material and is often wedge shaped. On one side of waveguide 16 is waveguide reflector 18 formed of a specular material, such as aluminum or a coated white surface, for reflecting light back to waveguide 16. Waveguide reflector 18 can be curved or flat. Diffuser 20 is a film that diffuses the light from the waveguide into a substantially uniform distribution. An example of a suitable diffuser is a randomly textured surface or gradient index film or engineered diffractive structure.

Above diffuser 20, first light-redirecting film 22 has moth-eye structure 24 on a first side adjacent waveguide 16. Second side of first light-redirecting film 22 has prism structure 25. An optional abrasion reduction layer 26 is between first light-redirecting film 22 and second light-redirecting film 28. The abrasion reduction layer can have a moth-eye structure on one or two surfaces to improve performance. Second light-redirecting film 28 has moth-eye structure 30 on a first side adjacent first light-redirecting film 22 and prism structure 32. Prism structure 32 of second light-redirecting film 28 can be oriented in the same direction as the prisms on first light-redirecting film 22. Alternatively, it may be offset by rotating the prism orientation up to about 180 degrees. In one embodiment, the second light-redirecting film is rotated about 90 degrees with respect to the first light-redirecting film to reduce moiré fringe formation and improve the uniformity of the exiting light distribution. Above the second light-redirecting film is a liquid crystal display 34 or display panel. A light-redirecting film that has linear prisms designed with a tilt, size, and included angle that match the light source, waveguide, and diffuser properties provides enhanced performance. Employing linear prism arrays with included angles that range from 95 degrees to 120 degrees provides a light distribution that is optimized for viewing angles of a computer screen. The included angle is considered the top angle of a triangular linear prism structure. A diffuser can also be positioned between the second light-redirecting film 28 and the display panel 34.

In alternative embodiments, the moth-eye structures 24, 30 are linear moth-eye structures and can be oriented parallel or non-parallel to the respective linear prisms 25, 32 in a horizontal orientation. In a particular embodiment, longitudinal axes of the moth-eye structures 24 are about perpendicular to longitudinal axes of the prisms 25, while longitudinal axes of the moth-eye structures 30 are about perpendicular to longitudinal axes of the prisms 32. In another embodiment, the moth-eye structures 24 are about perpendicular to the prisms 25, while the moth-eye structures 30 are about parallel to the prisms 32. In further embodiments, the moth-eye structures 24 are about parallel to the prisms 25, while the moth-eye structures 30 are about perpendicular to the prisms 32. In alternative embodiments, the moth-eye structures 24, 30 are about parallel to respective prisms 25, 32. In further embodiments, the moth-eye structures 24 and/or 30 are oriented non-parallel and non-perpendicular to respective prisms 25, 32, depending on the desired optical properties.

When the linear moth-eye structures have a pitch near 225 nm and the linear prism apex angle is about 90 degrees, resonance of the light causes a green color viewed from wide-viewing angles (angles at about 70 to 80 degrees from normal) that are perpendicular to the direction of the linear moth-eye structures. For example, if the product is constructed so that both films, even if they are crossed at 90 degrees, have both linear moth-eye structures oriented perpendicular to a cold cathode fluorescent light source, the color appears only in a side-to-side direction in a display where the light source is located across the bottom of the display. By orienting the linear moth-eye structures parallel to each other, the color can be controlled to be on only one viewing axis. When the linear moth-eye structures are perpendicular to each other, the color is evident on two viewing axes that are perpendicular to each other. This latter result is the same as having regularly spaced 225 nm pitch two-dimensional structures (as compared to linear moth-eye structures) that produce color at wide-viewing angles in two axes that are perpendicular to each other. One reason for using linear moth-eye structures is to control the direction at which the color can be viewed. When the pitch of the moth-eye structures is made to be less than about 180 nm, the resonant colors are not present at the wide-viewing angles and the need to use linear moth-eye structures is no longer present. In accordance with embodiments of the invention, the moth-eye structures are linear, having a pitch between about 150 and 350 nanometers.

Figure 2:
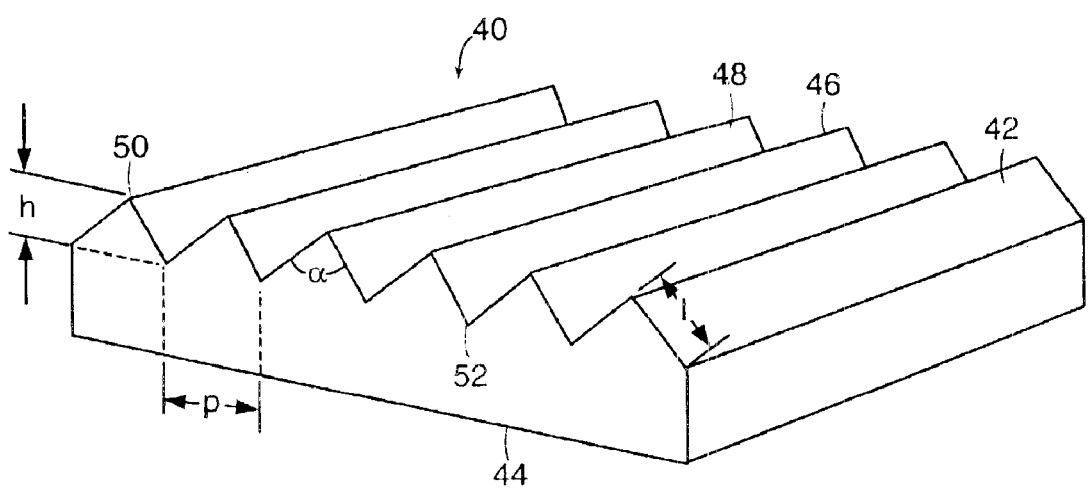
FIG. 2 illustrates a perspective view of a linear prism structure.
Figure 3:
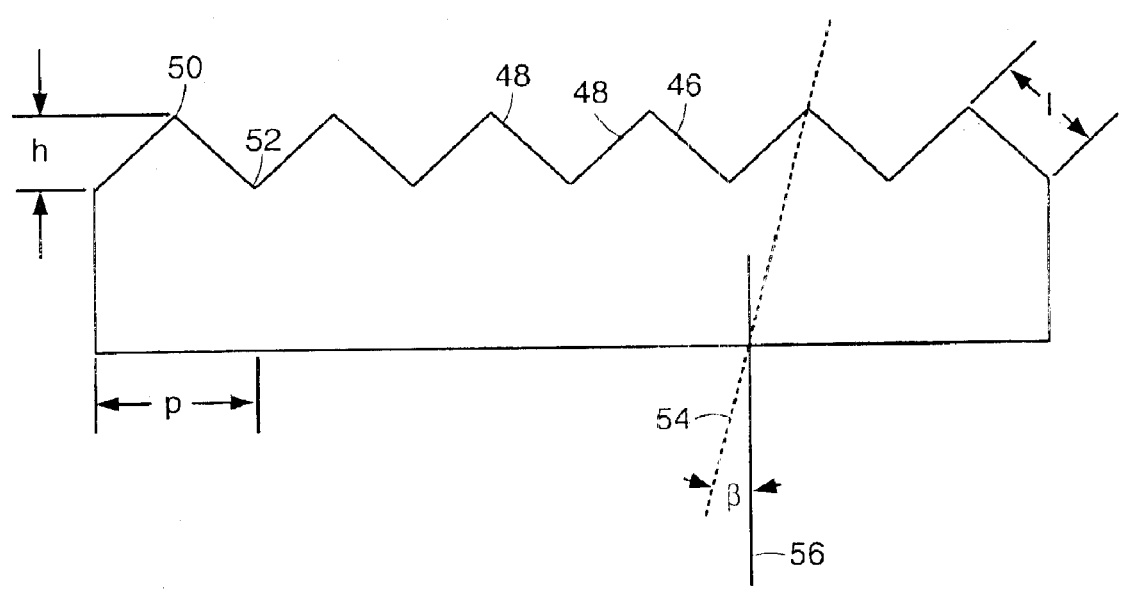
FIG. 3 illustrates a side view of the linear prism structure shown in FIG. 2.

An example of a linear prism film is shown in a perspective view in FIG. 2 and in a side view in FIG. 3. Linear prism film 40 has prism surface 42 and window surface 44 and is formed of a transparent polymeric material. Prisms 46 have sides 48 with peaks 50 and valleys 52. The pitch (p) of the prisms 46 is measured from valley 52 to next valley 52. The pitch can be in the range of between 0.001 and 0.003 inches (25 and 76 $\mu$m). The height (h) of the linear prisms is measured by the vertical distance from the valley 52 to peak 50. The height can be in the range of between 0.0003 and 0.0015 inches (7.6 and 38 $\mu$m). The included angle ($\alpha$) is measured between the two sides that meet at peak 50. The angle ($\alpha$) can range from about 60 to 120 degrees. In a preferred embodiment, the angle ($\alpha$) is in a range of between about 60 and 85 degrees or between about 95 and 120 degrees. Sides 48 on each side of the peak 50 can be the side length (l) from valley 52 to peak 50 to form an isosceles triangle. Alternatively, the sides can have different lengths, thereby tilting or canting the prisms. The tilting angle ($\beta$) of the prisms is between the optical axis 54 and a line 56 perpendicular to the window side 44. The prisms can be tilted in the range of between about −44 and +44 degrees. In one embodiment, the tilting is about seven degrees.

In other embodiments, prism structures 22, 32 can include lenticular linear elements, such as disclosed in U.S. Pat. No. 5,592,332, issued to Nishio et al. on Jan. 7, 1997.

Figure 4:
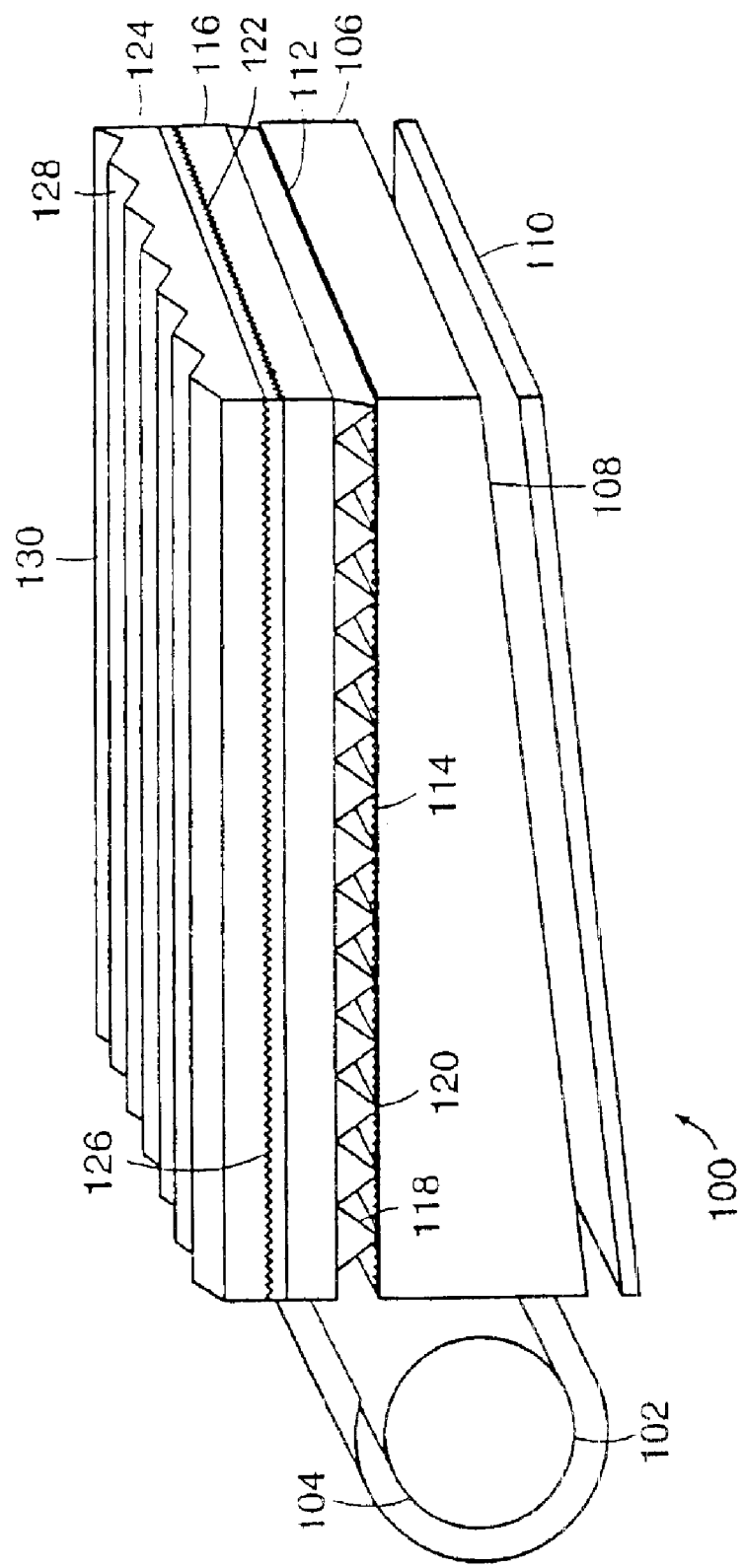
FIG. 4 illustrates a cross-sectional view of a second embodiment of a back lighting system.

Another embodiment of the present invention is shown in FIG. 4. A back lighting system 100 includes a light source 102 and a light reflector 104. Waveguide 106 can be formed of a transparent solid material and can be wedge-shaped. Adjacent to the first side 108 of waveguide 106 is waveguide reflector 110 formed of a specular material. The reflector 110 is spaced slightly away from surface 108 to allow total internal reflection at surface 108 to take place. First side 108 can be stepped in shape. Second side 112 of waveguide 106 is on the opposite side away from waveguide reflector 110. Second side 112 has moth-eye structures 114.

Above waveguide 106, first light-redirecting film 116 has first prism structure 118 with peaks 120 pointed toward waveguide 106 and first moth-eye structures 122 on the window side of first prism structure 118. Preferably, the peaks of linear prisms on first light-redirecting film 116 run parallel to light source 102. Above first light-redirecting film 116, second light-redirecting film 124 has second moth-eye structure 126 and second prism structure 128. Peaks 130 of second prism structure 128 point away from waveguide 106. Preferably, the peaks 130 of second prism structure 128 are oriented in a non-parallel direction to peaks 120 of first prism structure 118. A more preferred orientation is 90 degrees.

In one embodiment, the first moth-eye structures 122 are oriented at about 90 degrees relative to the peaks of the linear prisms on the first light-redirecting film 116. In one embodiment, angle ($\alpha$) of the linear prisms on the first light-redirecting film 116 is about 88 degrees. In another embodiment, angle ($\alpha$) is about 89 degrees.

The second moth-eye structures 126 can be oriented at about 90 degrees relative to the peaks of the second light-redirecting film 124. In one embodiment, angle ($\alpha$) of the linear prisms on the light-redirecting film 116 is about 88 degrees. In another embodiment, angle ($\alpha$) is about 89 degrees. The moth-eye structures 122, 126 are oriented at about 90 degrees relative to the linear prisms of respective light-redirecting films 116, 124 to minimize, and preferably eliminate, the deep blue to deep green color that is produced by light resonance, and which is visible, at wide entrance angles.

In one embodiment having the moth-eye structures 122, 126 oriented 90 degrees relative to the linear prisms of respective light-redirecting films 116, 124, only a small amount of green color shows at very wide-viewing angles, for example, 70 to 80 degrees from normal. In contrast, when the moth-eye structures 122, 126 are oriented parallel to the linear prisms of respective light-redirecting films 116, 124, the off-axis color becomes a very vivid purple-blue at a viewing angle of about 45 degrees from normal. In some applications, this vivid color may be desirable where a narrow useable viewing is needed, such as in security/privacy applications.

In the embodiment having 88 degree linear prisms on light-redirecting films 116, 124 with moth-eye structures 122, 126 oriented at about 90 degrees relative to respective linear prisms, a 4% performance increase over commercially available brightness enhancing films having 90 degree prisms has been realized.

In the embodiment having 89 degree linear prisms on light-redirecting films 116, 124 with moth-eye structures 122, 126 oriented at about 90 degrees relative to respective linear prisms, a 6% performance increase over commercially available brightness films having 90 degree prisms has been realized.

The performance of TIR (total internally reflecting) films, often called BEF (brightness enhancing film), which are used to increase the light output from back lighting systems in AMLCD flat panel displays, can be improved by changing the tilt angle of the linear prism, the linear prism included angle, and also the pitch of the linear prism array. A further improvement can be made by making the film monolithic or polylithic. A monolithic film removes one material interface (at the substrate) and improves optical transmission. In the case of the polylithic film, a diffuser can be incorporated into the film structure, saving the need to fabricate a separate diffuser and dependent on the degree of collimation required.

A fine pitch of a linear corner cube prism structure provides excellent performance as a first layer in a back lighting system if a diffuser is not used between the top smooth surface of a waveguide and a flat surface of the linear micro corner cube sheet. A fine pitch, preferably in the range of between about 0.00005 and 0.0001 inches (1.3 and 2.5 $\mu$m), of the corner cube array helps to spread the refracted and retroreflected light by diffraction, creating increased diffusion of recycled light. In a more preferred embodiment, the pitch is about 0.000075 inches (1.9 $\mu$m). The refracted and retroreflected light is spread by one to two degrees, depending on the accuracy of the linear corner cube array dihedral angles. This spreading is then increased by diffuse structures on the second surface of the waveguide, creating a smooth diffuse light pattern without the need of the diffuser between the waveguide and linear corner cube light-redirecting sheet. In addition, the groove pattern in the linear corner cube array is oriented in directions that do not modulate with the diffuse dot pattern on the rear of the waveguide. Therefore, moiré fringes are not created. A surface is disclosed in U.S. Pat. No. 5,600,462, issued to Suzuki et al. on Feb. 4, 1997, the teachings of which are incorporated herein by reference, which employs a rough structure (0.004 inches, 10 $\mu$m) for performing diffuse transmission to create a "ground glass-type diffusion."

Also, it has been found that the addition of one or two 95 degree linear prism sheet(s) with 0.0019 inch (48 $\mu$m) pitch above the fine pitch linear corner cube sheet and with the smooth surface oriented toward the corner cube array further enhances the brightness. The second linear prism sheet is oriented about 90 degrees with respect to the first sheet.

The materials that work well for optical microstructured films are ultraviolet-cured polymers bonded to a polyester substrate, which can have abrasion resistance which is important during handling of the light-redirecting films. If the prism tips are damaged during handling, the resulting display can have fine lines that appear as less bright than surrounding areas on axis and brighter than surrounding areas off-axis. The films can be formed of suitable polymers, such as polycarbonate. The films can be constructed from a polycarbonate material, acrylic, or other suitable material, such as disclosed in U.S. Pat. No. 5,396,350, issued to Beeson et al. on Mar. 7, 1995, the teachings of which are incorporated herein by reference.

An abrasion reduction sheeting, such as a thin polypropylene film or similar material, can be placed in between the light-redirecting film layers to help to reduce any effect from abrasion without losing significant brightness. Subwavelength visible light moth-eye structures can be used on these overleaf films to effectively eliminate Fresnel reflection light losses. The softer films do not abrade the linear prism peaks as easily as hard films. A semi-soft substrate, such as a polyvinyl chloride film, can be used in place of the polyester substrate to make light-redirecting films and reduce abrasion. However, one must be careful of out-gassing and resulting surface contamination that can occur with polyvinyl chloride.

A linear non-isosceles prism array tilted or canted in the range of between about −45 and +45 degrees and preferably at seven degrees, having a 95 degree included angle and a 0.0019 inch (48 $\mu$m) pitch as a first layer and a linear isosceles prism (with zero tilt), having a 95 degree included angle and a 0.0019 inch (48 $\mu$m) pitch as a second layer can significantly improve the amount of light that is directed through an AMLCD to the angles (geometry's) desired for optimum user viewing angles. The tilt or canting of the optical axis of the first layer linear prism array corrects the skewed direction of the light distribution coming from the waveguide and diffuser. A 0.0019 inch (48 $\mu$m) pitch can cause diffraction spreading, which smooths the light distribution and maximizes the light directed toward the angles most beneficial or desired for a AMLCD display user. The 95 degree included angle further optimizes the field of view of the light distribution for the display user while still recycling light that is headed in the incorrect direction back into the display where it is used again.

Therefore, a preferred light-redirecting film combination for a wedge waveguide includes a first light-redirecting film that has prisms tilted to correct for the skew created by the waveguide wedge and diffuser layers and has a prism angle designed to maximize the user field of view plus a second light-redirecting film oriented at 90 degrees to the first and with a symmetrical linear prism pattern. In the second light-redirecting film the prisms can be tilted uniformly in both directions (tilt every other prism in the opposite direction) to have a prism angle that optimizes the user field of view for this axis.

Further, performance change can be achieved by combining the diffuser into the first zone of the first light-redirecting film to eliminate one film component. However, the focusing effect of the first surface is lost. The diffuser can be made by employing textured films and casting the linear prisms onto the smooth side of the film, by rotary screen printing a diffuse layer onto the polyester tie coat prior to casting the linear prisms onto the diffuse layer (in this embodiment the diffuse layer is sandwiched between the linear prisms and the substrate film), or by rotary screen printing a diffuse layer onto a carrier film and then casting linear prisms onto the diffuse layer. The prism and diffuse layer can be made of the same material and finish cured together, by adding particles into the tie coat prior to casting the linear prisms onto the tie coat, and by dispersing particles in the substrate sheet followed by casting linear prisms onto the substrate sheet.

The addition of the moth-eye structure to the window side of the light-redirecting films increases the system brightness by about 6% to 8%, which is significantly brighter (by 10% to 12%) than the previously known brightness-enhancing film systems with a similar pitch.

Figure 5:
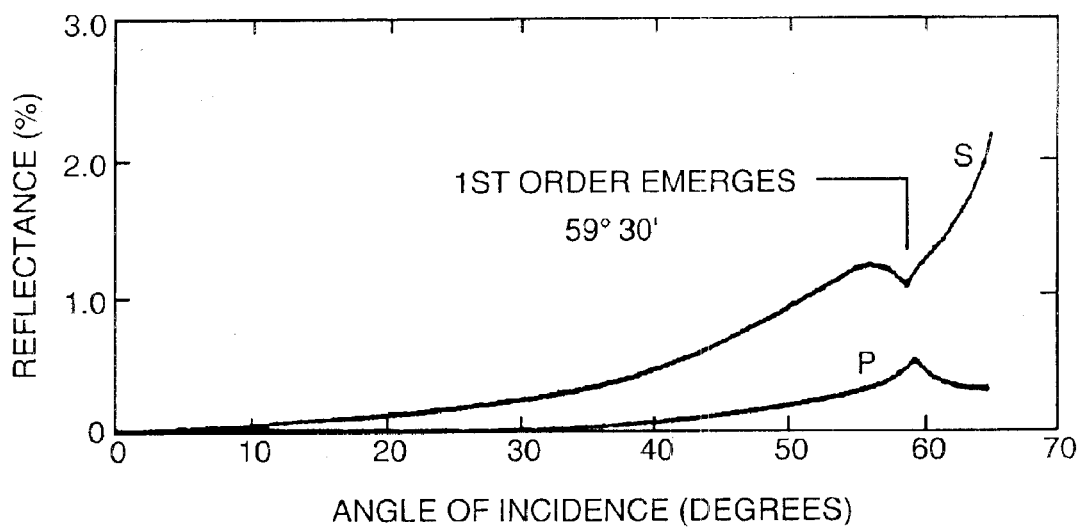
FIG. 5 shows a plot of reflectance as a function of angles of incidence and polarization for a moth-eye structure with 3,300 grooves per millimeter at a light wavelength of 514.5 nm.
Figure 6:
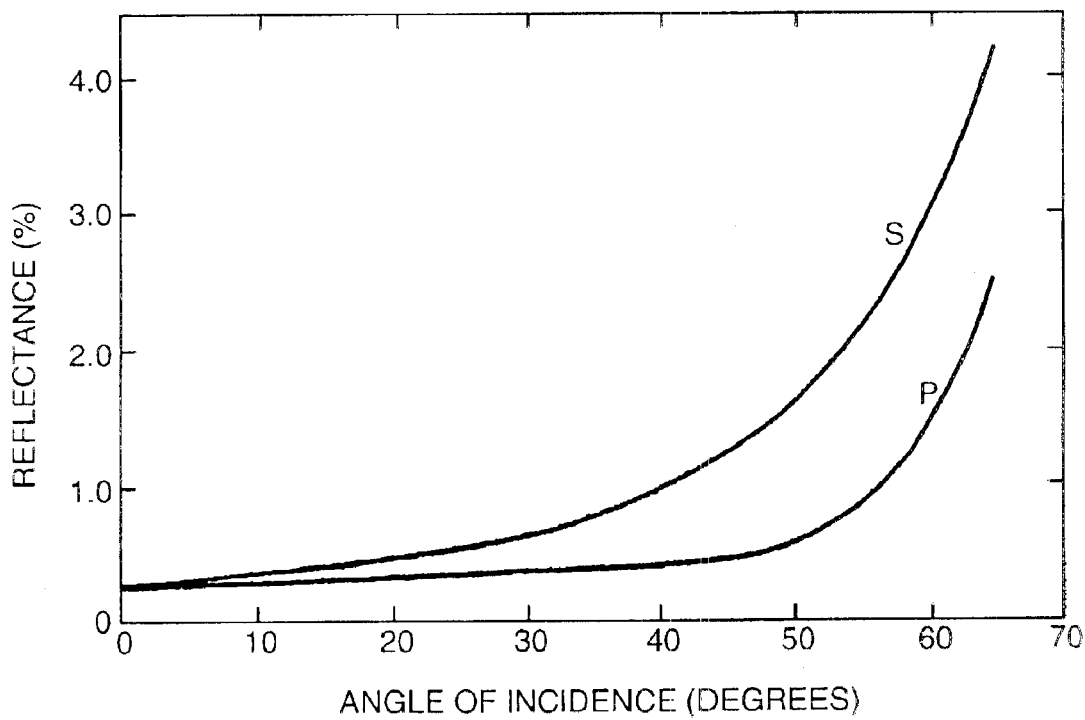
FIG. 6 shows a plot of reflectance as a function of angles of incidence and polarization for a moth-eye structure with 3,300 grooves per millimeter at a light wavelength of 647.1 nm.
Figure 7:
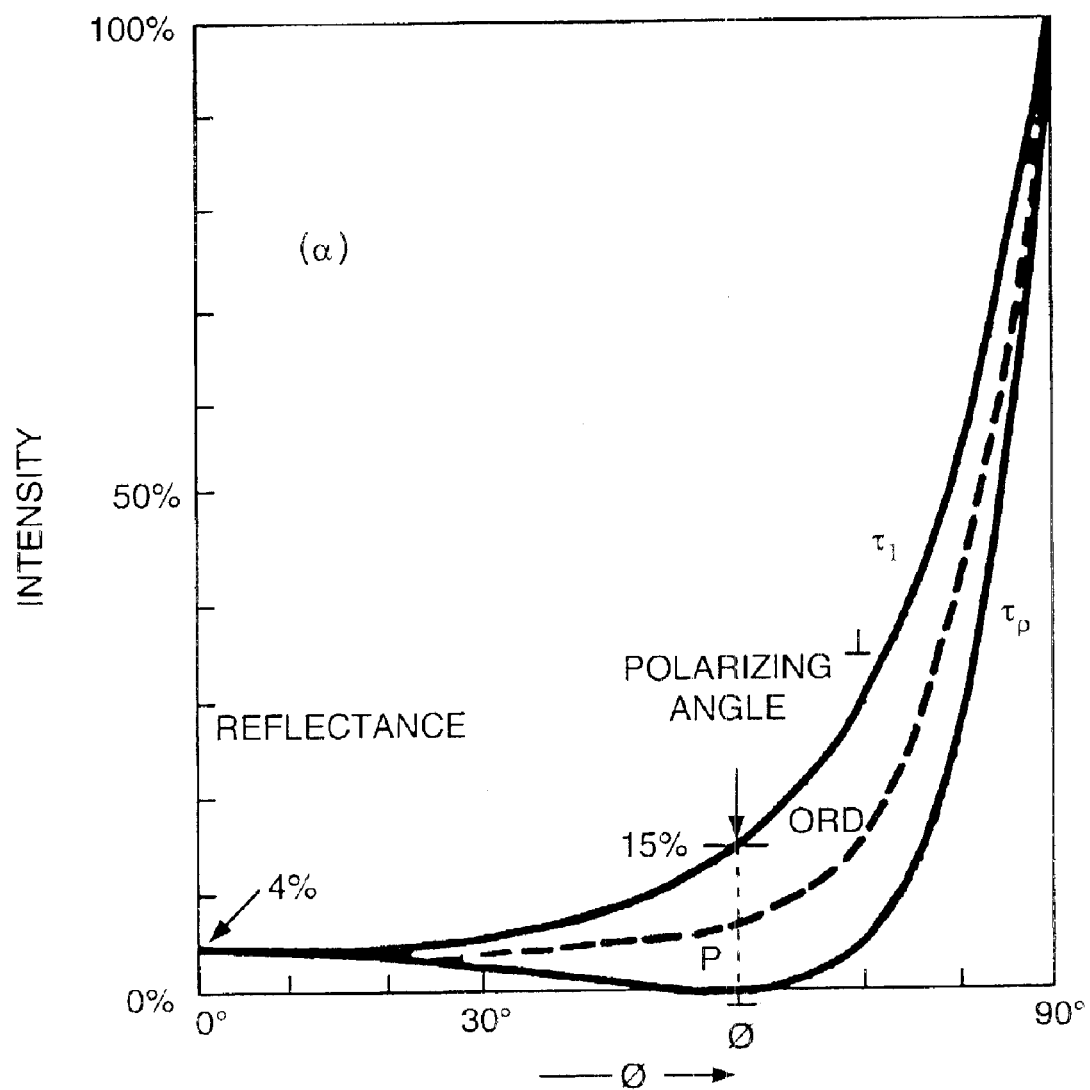
FIG. 7 shows a plot of reflectance for a dielectric having an index of refraction and a smooth non-moth-eye surface.

These improved results are believed to be due to a combination of microstructured optical effects. The uniform white light, such as a fluorescent bulb that causes this light to have a cool appearance because of the blue shift, has distribution coming from the diffuser that is incident on the first layer moth-eye surface. At angles of incidence of +/−60 degrees, 2% or less of the light is reflected at the first layer moth-eye to air interface. Plots of the reflectance are shown in FIGS. 5 and 6 for a subwavelength microstructure having 3,300 grooves per millimeter of light having wavelengths of 514.5 nm and 647.1 nm, respectively. The S line represents light perpendicular to the plane of incidence, and the P line represents light parallel to the plane of incidence. Shown in FIG. 5, the average reflectance (linear average between S and P lines) is about 0.8% at 60 degrees and shown in FIG. 6, the average reflectance is about 2% at 60 degrees. This is compared to an average of about 10% of the light that is reflected at a smooth non-moth-eye surface at a 60 degree angle of incidence. FIG. 7 shows a plot of an average of about 10% reflectance at a 60 degree incident angle. Also at normal incidence, a typical 4% reflectance due to a smooth surface is reduced to less than 1% with a moth-eye structure.

At angles of incidence that are greater than 75 degrees, a green and then a blue color can be observed. The color is a result of diffraction scattering as the short wavelengths enter the moth-eye structure from an angle that causes the aperture of the moth-eye elements to become diffractive and resonate. This diffraction scattered light is processed by the linear prism film differently than the light that passes through a non-moth-eye smooth surface. In this embodiment, the green to blue light is more uniformly distributed throughout the film, creating a more uniform illumination. A significant amount of green light is light piped by total internal reflection within the film and is partially filtered out of the light that becomes available to illuminate an LCD panel. Different size (frequency and amplitude) moth-eye structures can be used to create different illumination effects depending on the light source and optical components used in the illumination system. By changing the size of the moth-eye structures in the range from sub-wavelength to larger than wavelength scale structures, for example, moth-eye structures having a period of between about 0.15 and 10.0 micrometers, the diffraction properties of the surface can be optimized to help smooth the resulting light distribution and improve wide angle light distribution.

After the light has passed through the first moth-eye layer, it is redirected in a collimating fashion to about 42 degrees, and the 95 degree linear prism second surface of the first film layer through refraction collimates the light to approximately +/−30 degrees. Then the light enters the moth-eye surface on the first surface of the second layer film where it is further collimated by refraction. The majority of the light is at +/−30 degrees from the normal as it enters the moth-eye surface and passes through the moth-eye layer with little intensity loss. The light passes through the second layer film and is further redirected through refraction and recycling by the 95 degree linear prism structure. The 95 degree prism shape helps to recycle any of the light that is still traveling at wide angles of incidence. This light eventually emerges from the lighting system within a final +/−29 degree light distribution in both the X and Y axes.

Figure 8:
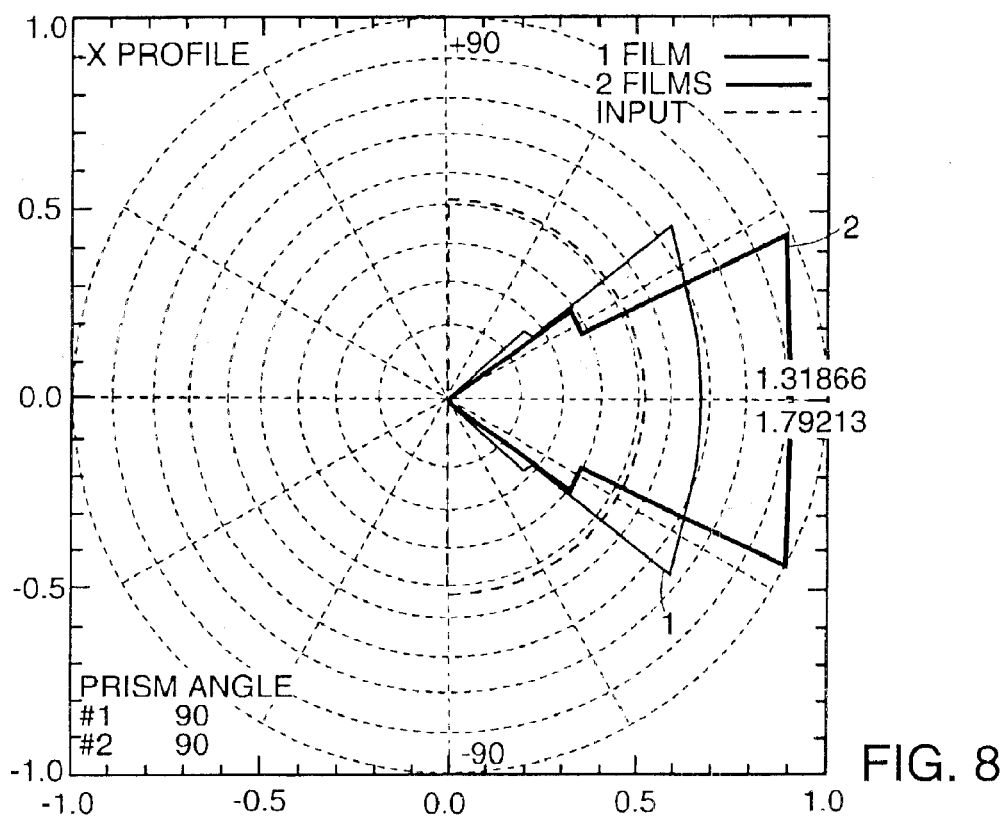
FIG. 8 shows a theoretical plot of output from a uniform light distribution X-profile for one and two films of 0.0019 inch (48 μm) pitch linear prisms having a prism angle of 90 degrees.
Figure 9:
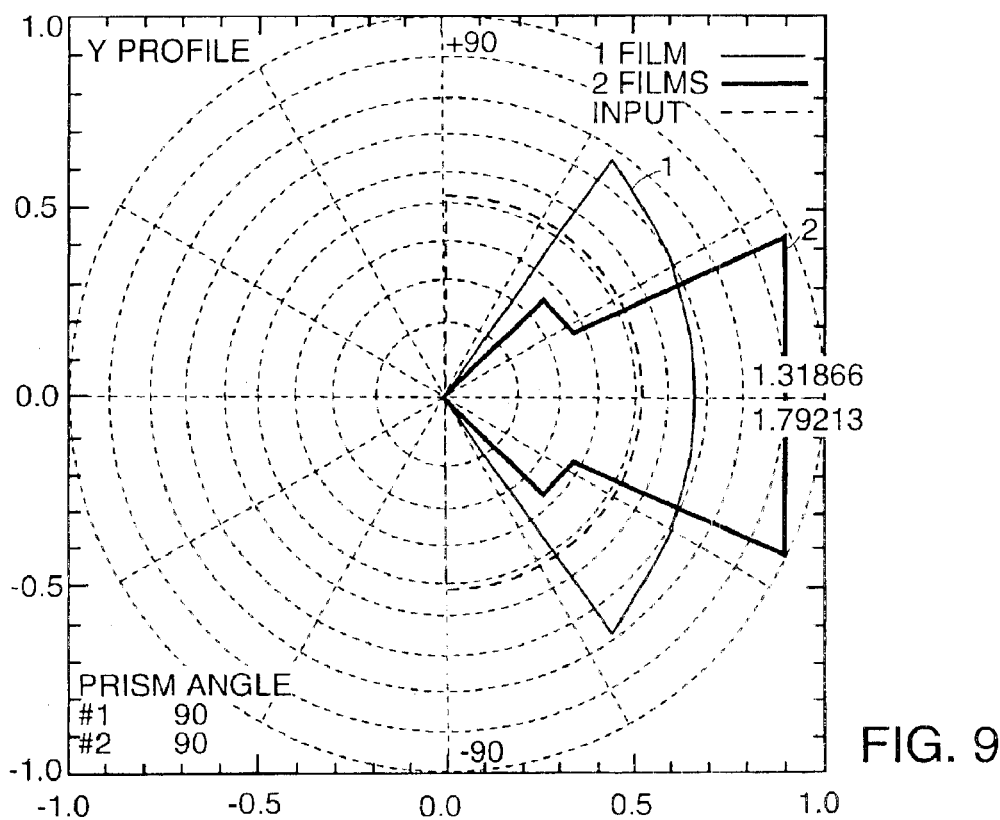
FIG. 9 shows a theoretical plot of output from a uniform light distribution Y-profile for one and two films of 0.0019 inch (48 μm) pitch linear prisms having a prism angle of 90 degrees.
Figure 10:
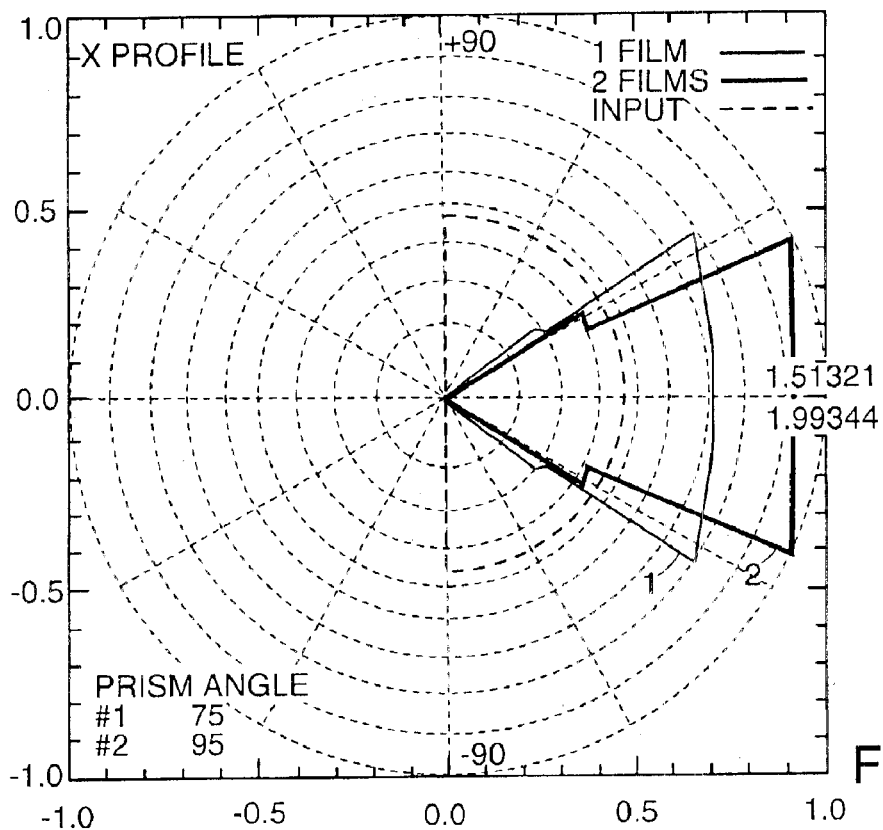
FIG. 10 shows a theoretical plot of output from a uniform light distribution X-profile for one and two films of 0.0019 inch (48 μm) pitch linear prisms having a prism angle of 75 and 95 degrees, respectively.
Figure 11:
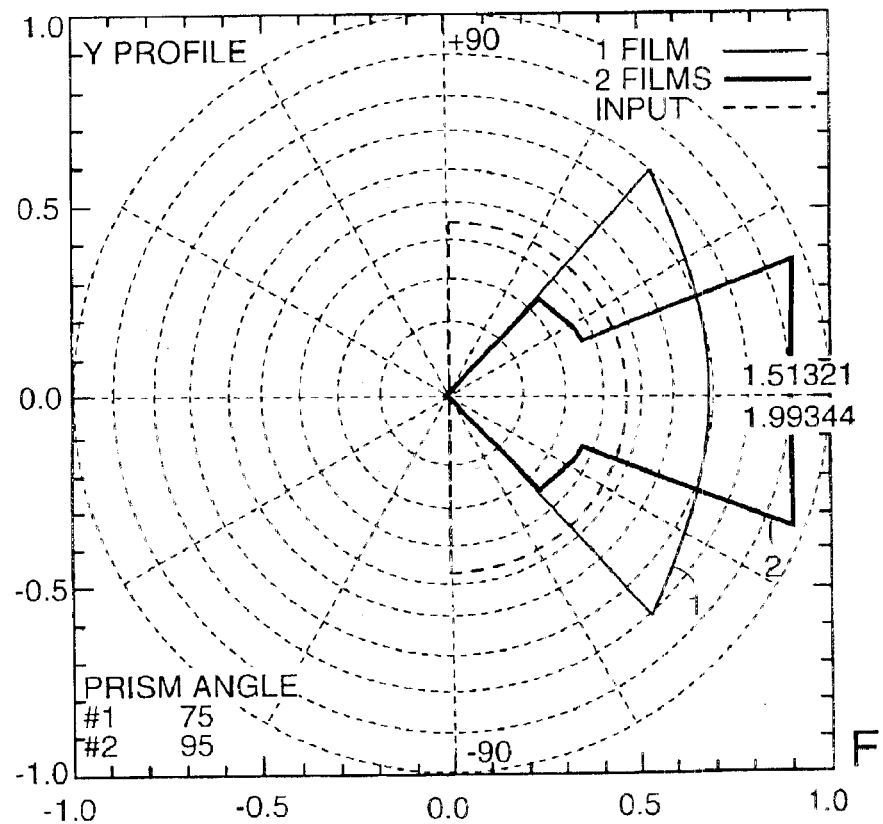
FIG. 11 shows a theoretical plot of output from a uniform light distribution Y-profile for one and two films of 0.0019 inch (48 μm) pitch linear prisms having a prism angle of 75 and 95 degrees, respectively.
Figure 12:
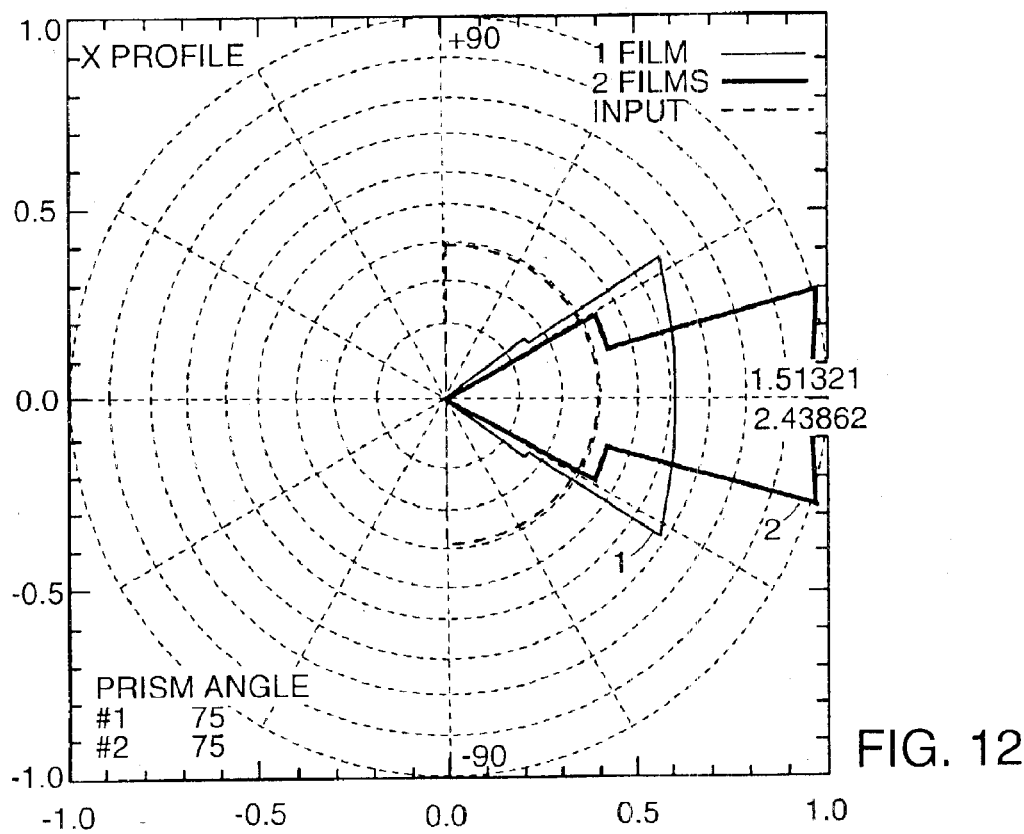
FIG. 12 shows a theoretical plot of output from a uniform light distribution X-profile for one and two films of 0.0019 inch (48 μm) linear prisms having a prism angle of 75 degrees.
Figure 13:
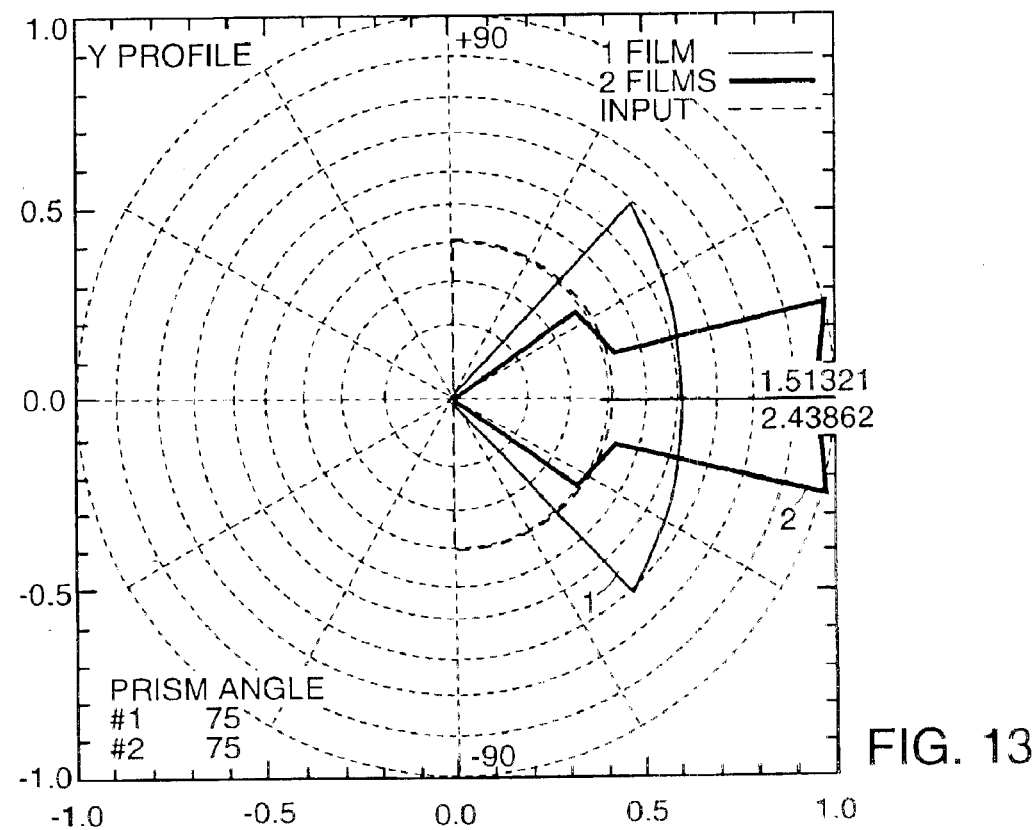
FIG. 13 shows a theoretical plot of output from a uniform light distribution Y-profile for one and two films of 0.0019 inch (48 μm) linear prisms having a prism angle of 75 degrees.
Figure 14:
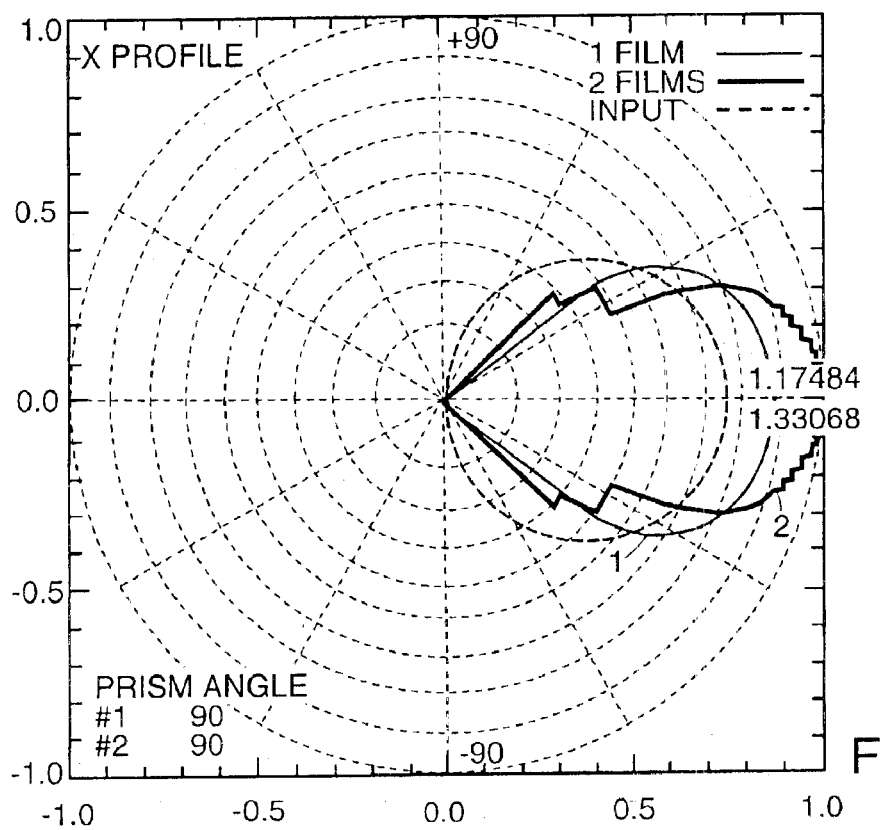
FIG. 14 shows a theoretical plot of output from a cosine light distribution X-profile for one and two films of 0.0019 inch (48 μm) pitch linear prisms having a prism angle of 90 degrees.
Figure 15:
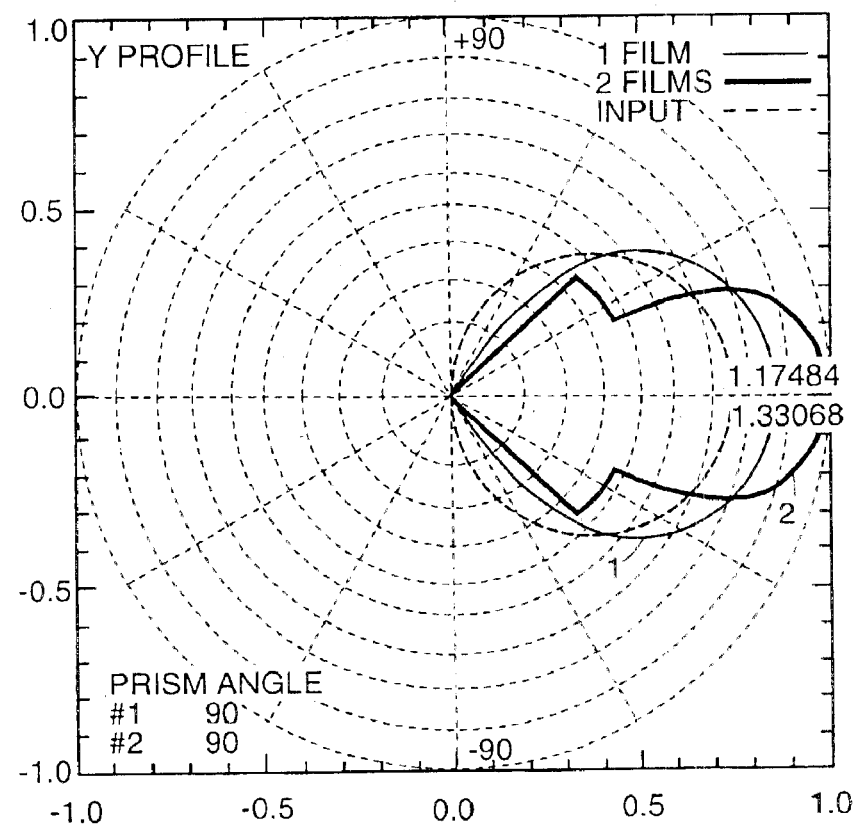
FIG. 15 shows a theoretical plot of output from a cosine light distribution Y-profile for one and two films of 0.0019 inch (48 μm) pitch linear prisms having a prism angle of 90 degrees.
Figure 16:
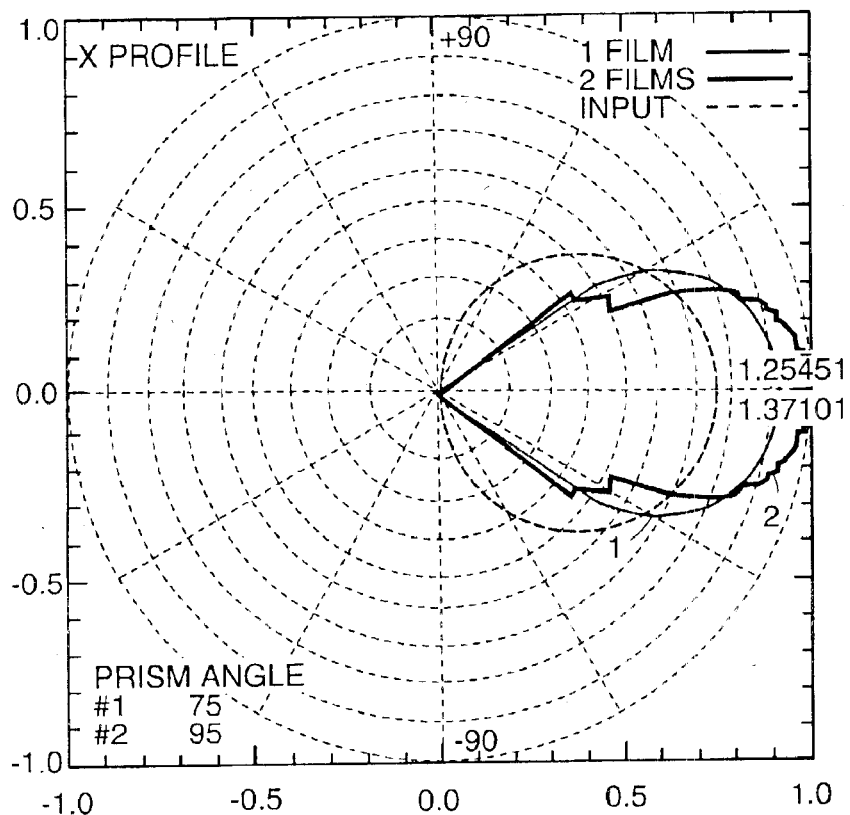
FIG. 16 shows a theoretical plot of output from a cosine light distribution X-profile for one and two films of 0.0019 inch (48 μm) pitch linear prisms having a prism angle of 75 and 95 degrees, respectively.
Figure 17:
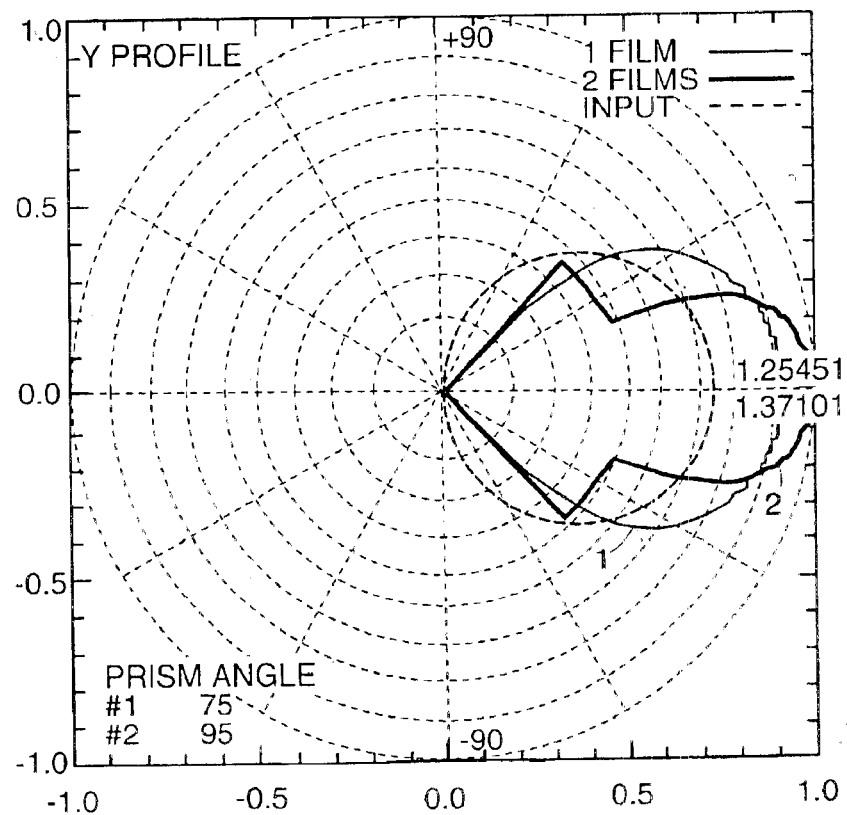
FIG. 17 shows a theoretical plot of output from a cosine light distribution Y-profile for one and two films of 0.0019 inch (48 μm) pitch linear prisms having a prism angle of 75 and 95 degrees, respectively.
Figure 18:
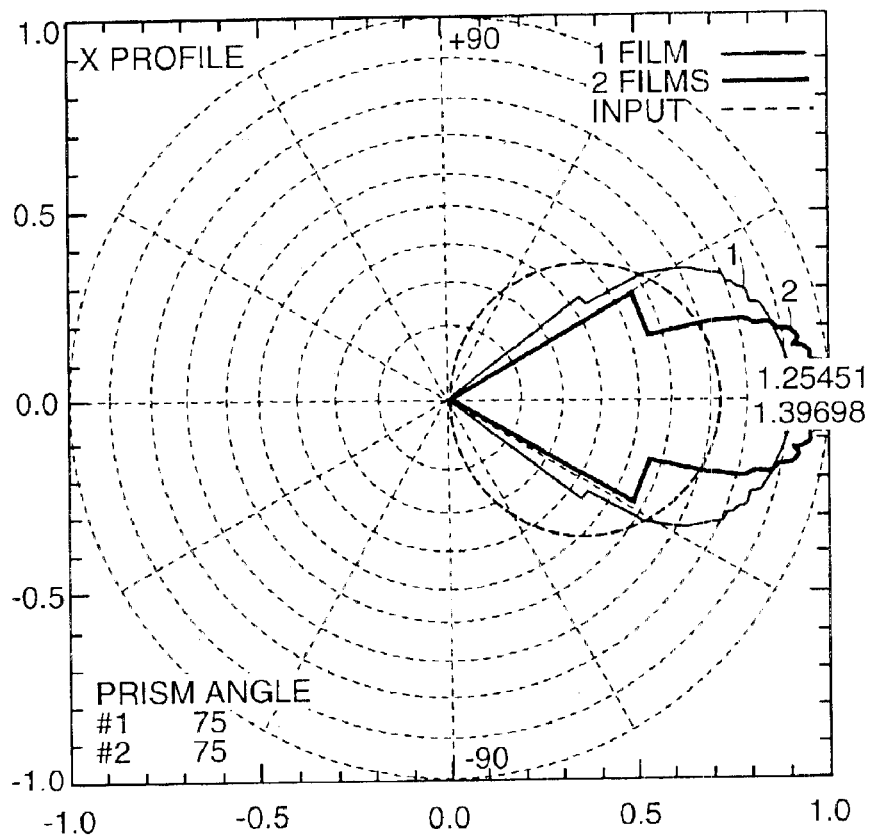
FIG. 18 shows a theoretical plot of output from a cosine light, distribution X-profile for one and two films of 0.0019 inch (48 μm) linear prisms having a prism angle of 75 degrees.
Figure 19:
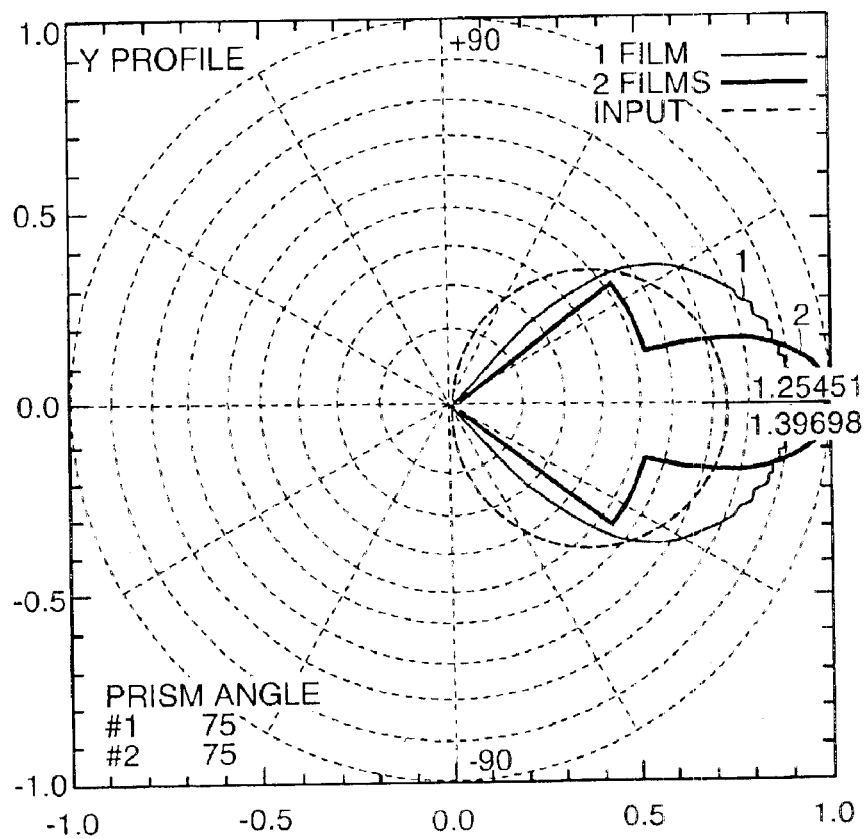
FIG. 19 shows a theoretical plot of output from a cosine light distribution Y-profile for one and two films of 0.0019 inch (48 μm) linear prisms having a prism angle of 75 degrees.

If two crossed 75 degree linear prism films with moth-eye smooth surfaces are used in the illumination system, a light intensity distribution width of +/−18 degrees and an intensity of 2.63 can be achieved. The light intensity distribution X-profile and Y-profile for uniform light through a film with 90 degree, 75 degree and 95 degree prism films are shown. FIGS. 8 and 9 show plots of output uniform light distribution of the X-profile and Y-profile, respectively, for one and two films of 0.0019 inch (48 μm) pitch for linear prisms having a prism angle of 90 degrees. FIGS. 10 and 11 show plots of output for uniform light distribution X-profile and Y-profile, respectively, for one and two films of 0.0019 inch (48 μm) pitch for linear prisms having a prism angle of 75 and 95 degrees, respectively. FIGS. 12 and 13 show plots of output for uniform light distribution X-profile and Y-profile, respectively, for one and two films of 0.0019 inch (48 μm) linear prisms having a prism angle of 75 degrees. FIGS. 14 and 15 show plots of output cosine light distribution of the X-profile and Y-profile, respectively, for one and two films of 0.0019 inch (48 μm) pitch for linear prisms having a prism angle of 90 degrees. FIGS. 16 and 17 show plots of output for cosine light distribution X-profile and Y-profile, respectively, for one and two films of 0.0019 inch (48 μm) pitch for linear prisms having a prism angle of 75 and 95 degrees respectively. FIGS. 18 and 19 show plots of output for cosine light distribution X-profile and Y-profile, respectively, for one and two films of 0.0019 inch (48 μm) linear prisms having a prism angle of 75 degrees. Additional optimization of the angles allows a near +/−10 degree intensity distribution. One disadvantage with this configuration is an approximate +/−2.0 degree void that appears at the center of the light intensity distribution. This effect is visible in FIGS. 12 and 13. Slight curvature or positive-negative canting in the prism facets can reduce this void.

The application of a moth-eye structure to the smooth surface of the linear prism films significantly improves the light-redirecting capability of the films by increasing light throughput at the moth-eye structured surface and redirecting wide incident angle light rays. Diffraction effects also play a significant role in the improved performance of the system. The resulting color of the backlight assembly is warmer in appearance than the same assembly without the addition of the moth-eye structures. This color shift can have a beneficial effect on the contrast within the final back light display.

Figure 20:
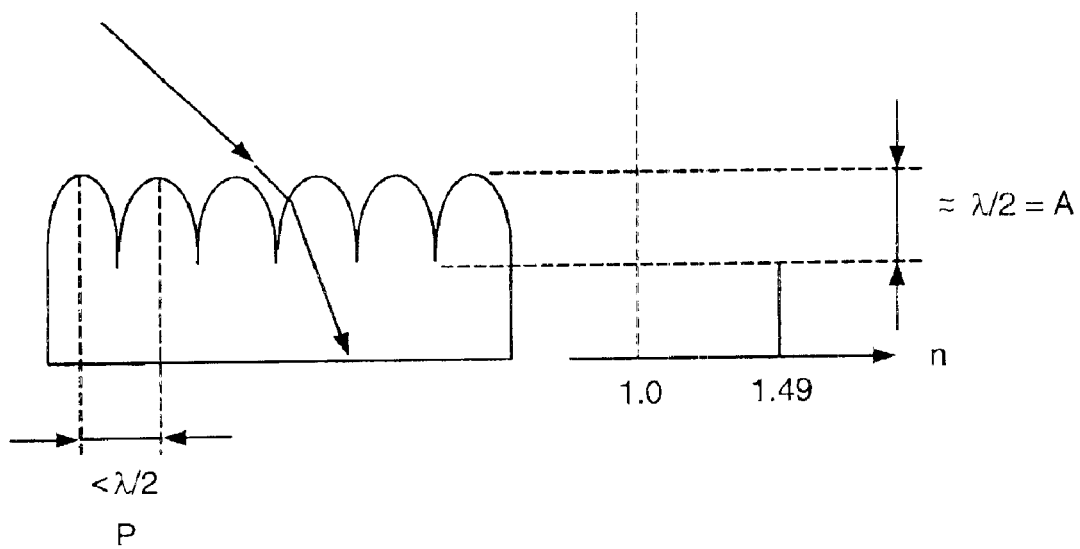
FIG. 20 illustrates a side view of a subwavelength optical microstructure.

As shown in FIG. 20, the moth-eye structure applied preferably has an amplitude (A) of about 0.4 micrometers and a period (P) of less than about 0.2 micrometers. The structure is sinusoidal in appearance and can provide a deep green to deep blue color when viewed at grazing angles of incidence. Preferably, the amplitude is about three times the period to provide a three to one aspect ratio.

Figure 21:
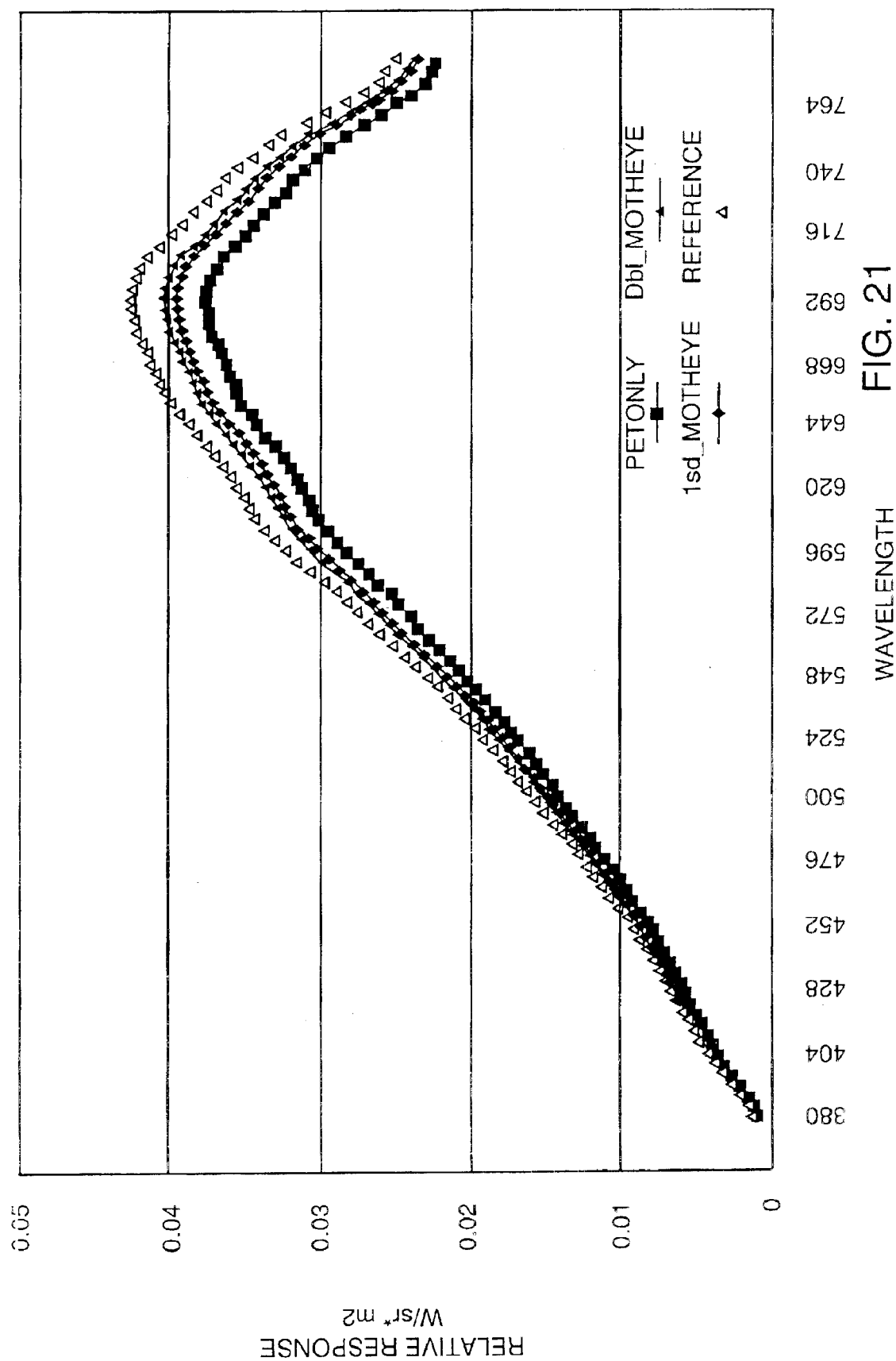
FIG. 21 shows a plot of relative response versus wavelength of light for a 0.002 inch (51 μm) thick film of polyester, 0.002 inch (51 μm) thick film of polyester with one side having moth-eye structures, 0.002 inch (51 μm) thick film of polyester with two sides having moth-eye structures, and a reference with a detector located normal to the surface of the film.
Figure 22:
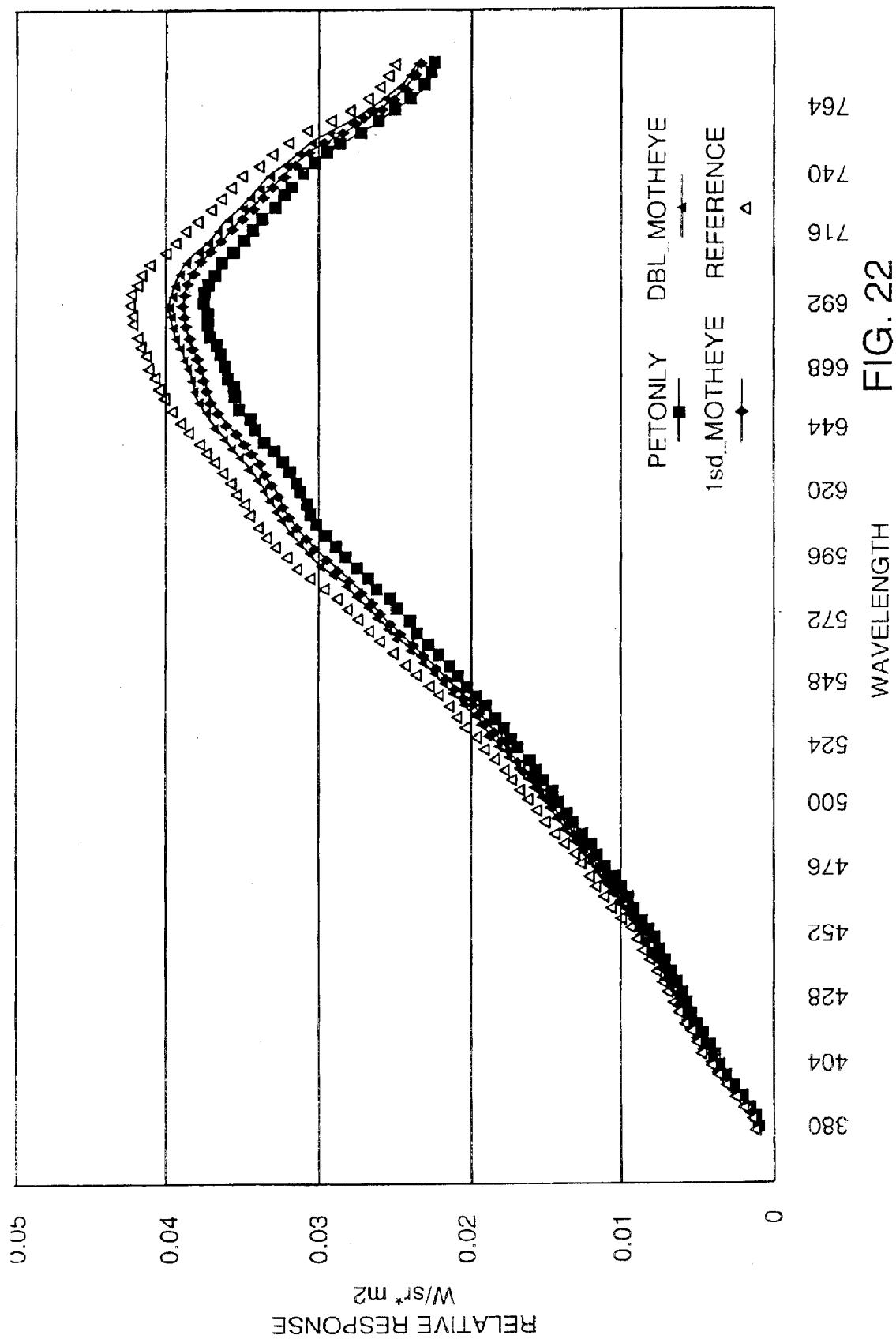
FIG. 22 shows a plot of relative response versus wavelength of light for a 0.002 inch (51 μm) thick film of polyester, 0.002 inch (51 μm) thick film of polyester with one side having moth-eye structures, 0.002 inch (51 μm) thick films of polyester with two sides having moth-eye structures, and a reference with a detector located at an angle 30 degrees from the normal to the surface of the film.
Figure 23:
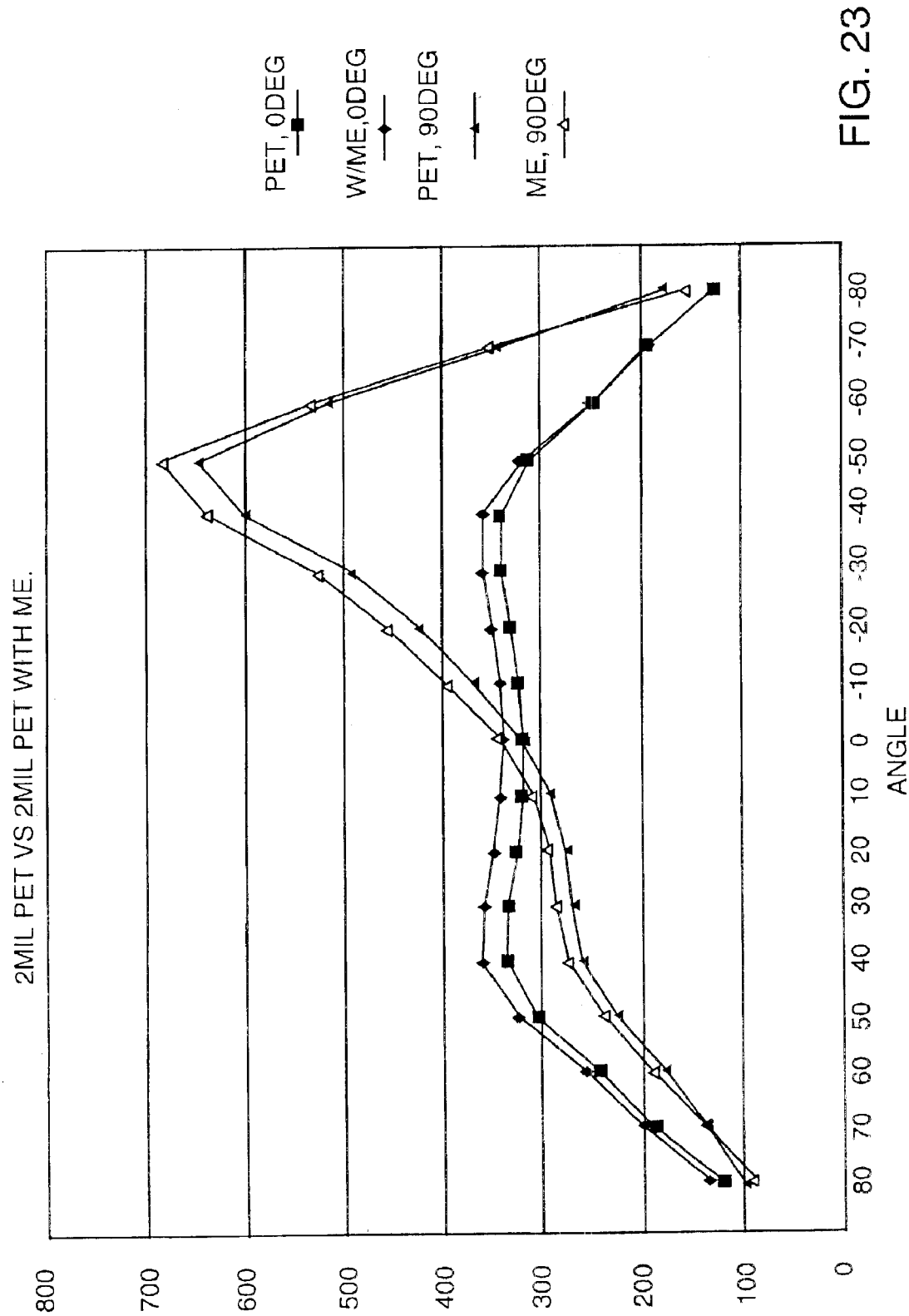
FIG. 23 shows a plot of light transmission versus angle from the normal of a 0.002 inch (51 μm) polyester film with and without a moth-eye structure on one side at the zero and 90 degree profile.
Figure 24:
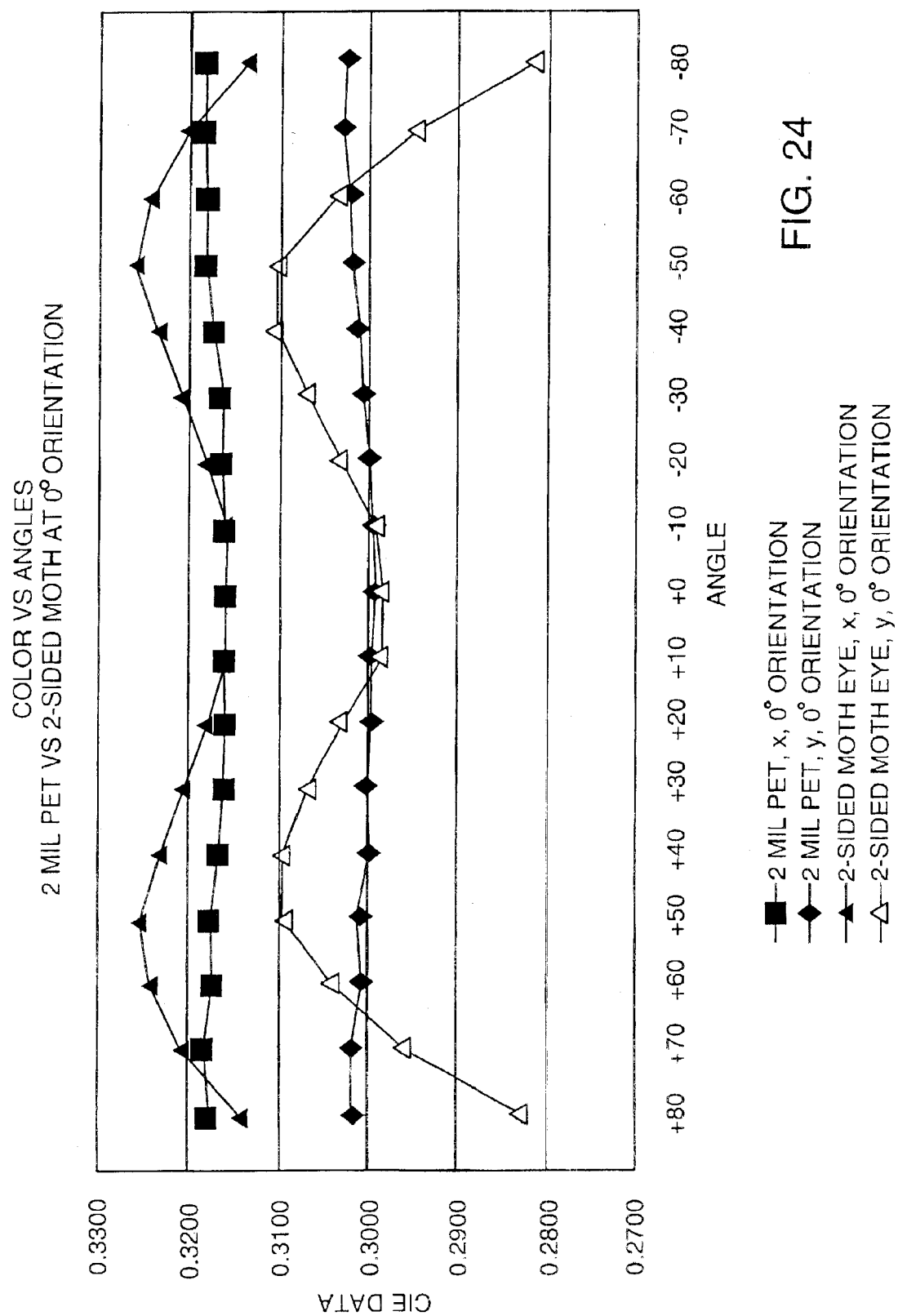
FIG. 24 shows a plot of color versus angle from the normal of a 0.002 inch (51 μm) thick polyester film with and without moth-eye structures on both sides observed at zero degree orientation.
Figure 25:
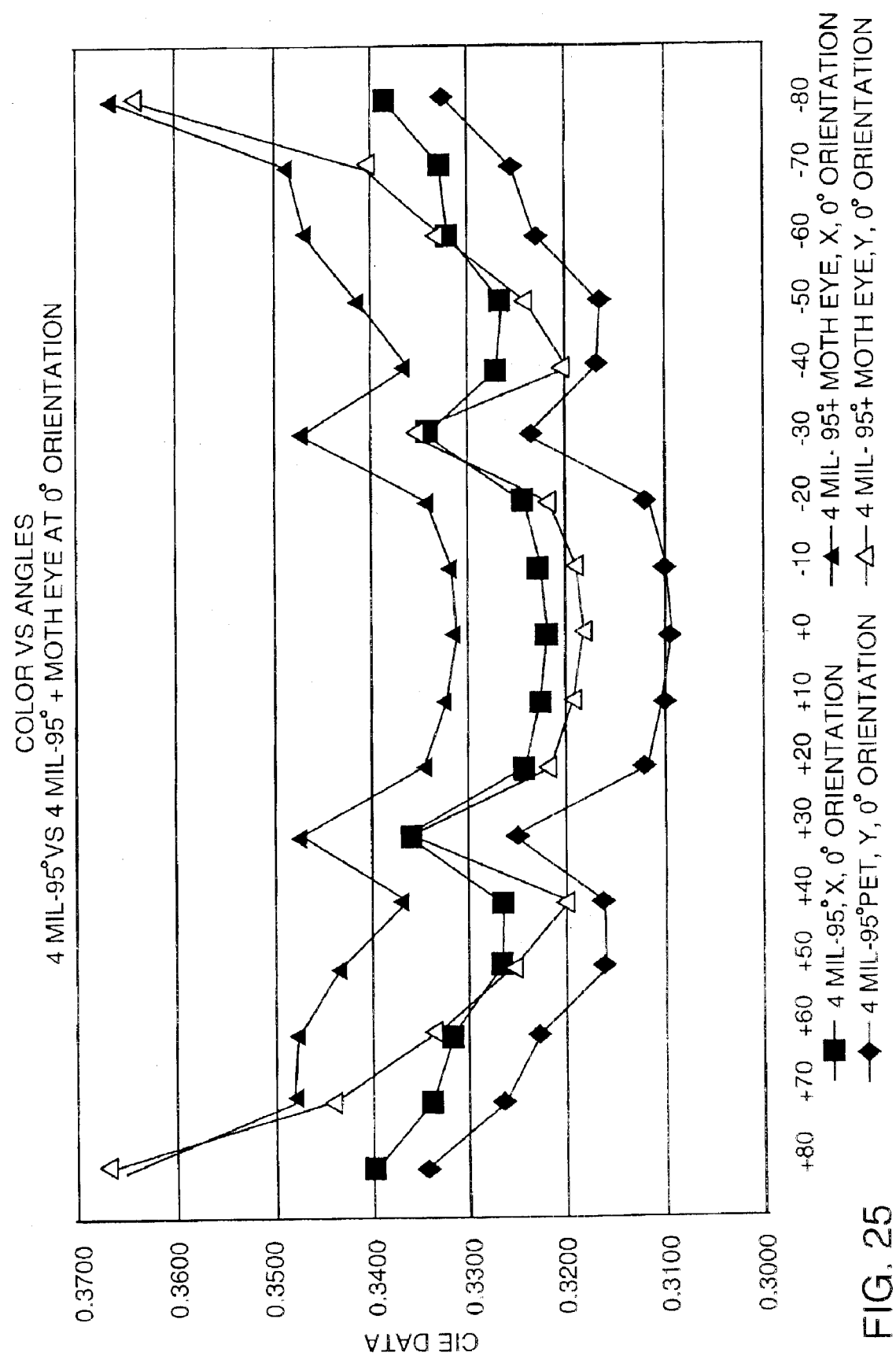
FIG. 25 shows a plot of color versus angle from the normal of a 0.004 inch (102 μm) thick polyester film with and without moth-eye structures on both sides observed at zero degree X-orientation and 90 degree Y-orientation.
Figure 26:
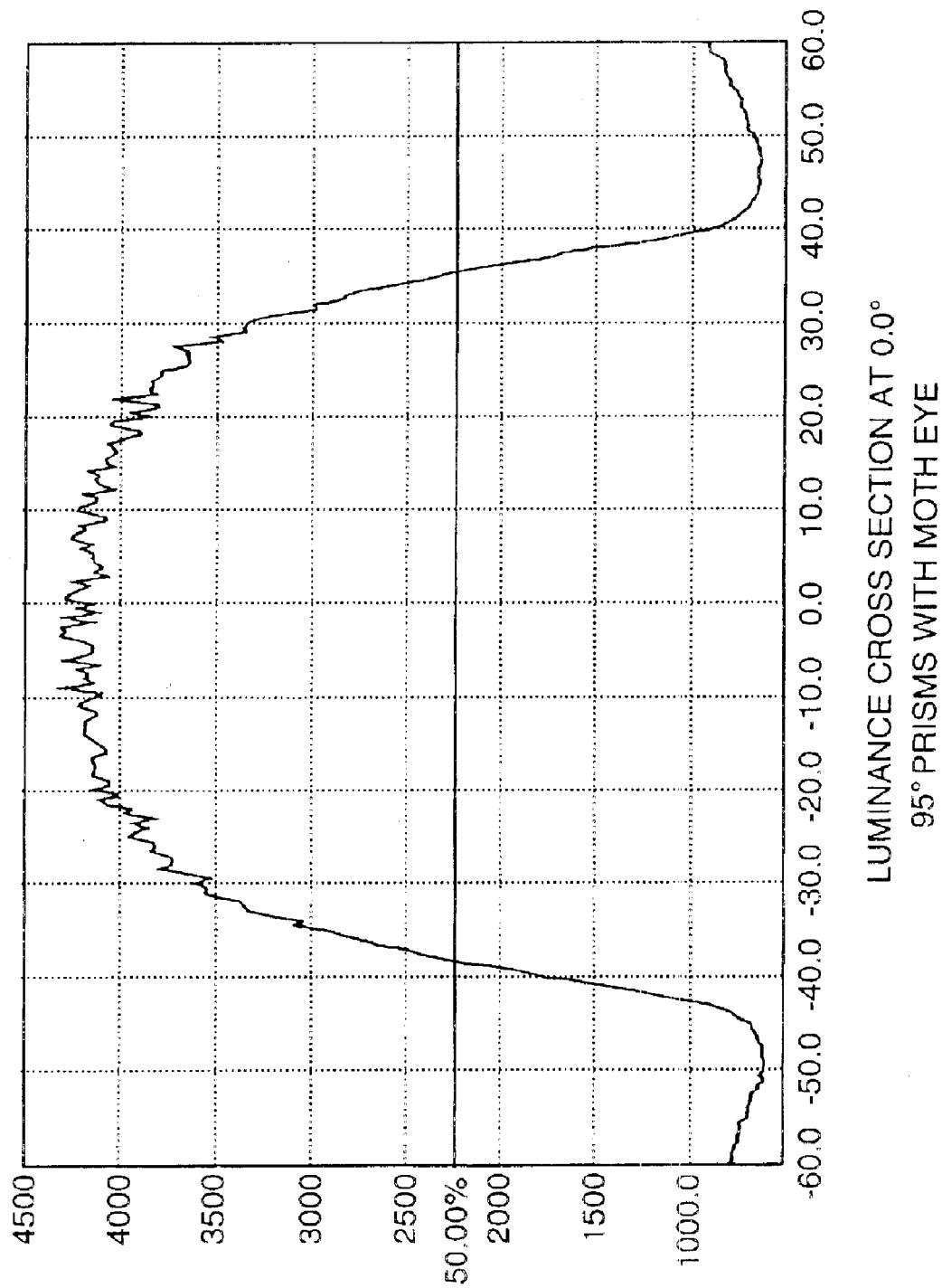
FIG. 26 is a plot of luminance cross section versus observation angle from the normal at zero degree orientation of a film with moth-eye structures having a period of about 0.2 μm and a height of about 0.4 μm and linear prisms with 95 degree included angle and a pitch of 0.0019 inches (48 μm).
Figure 27:
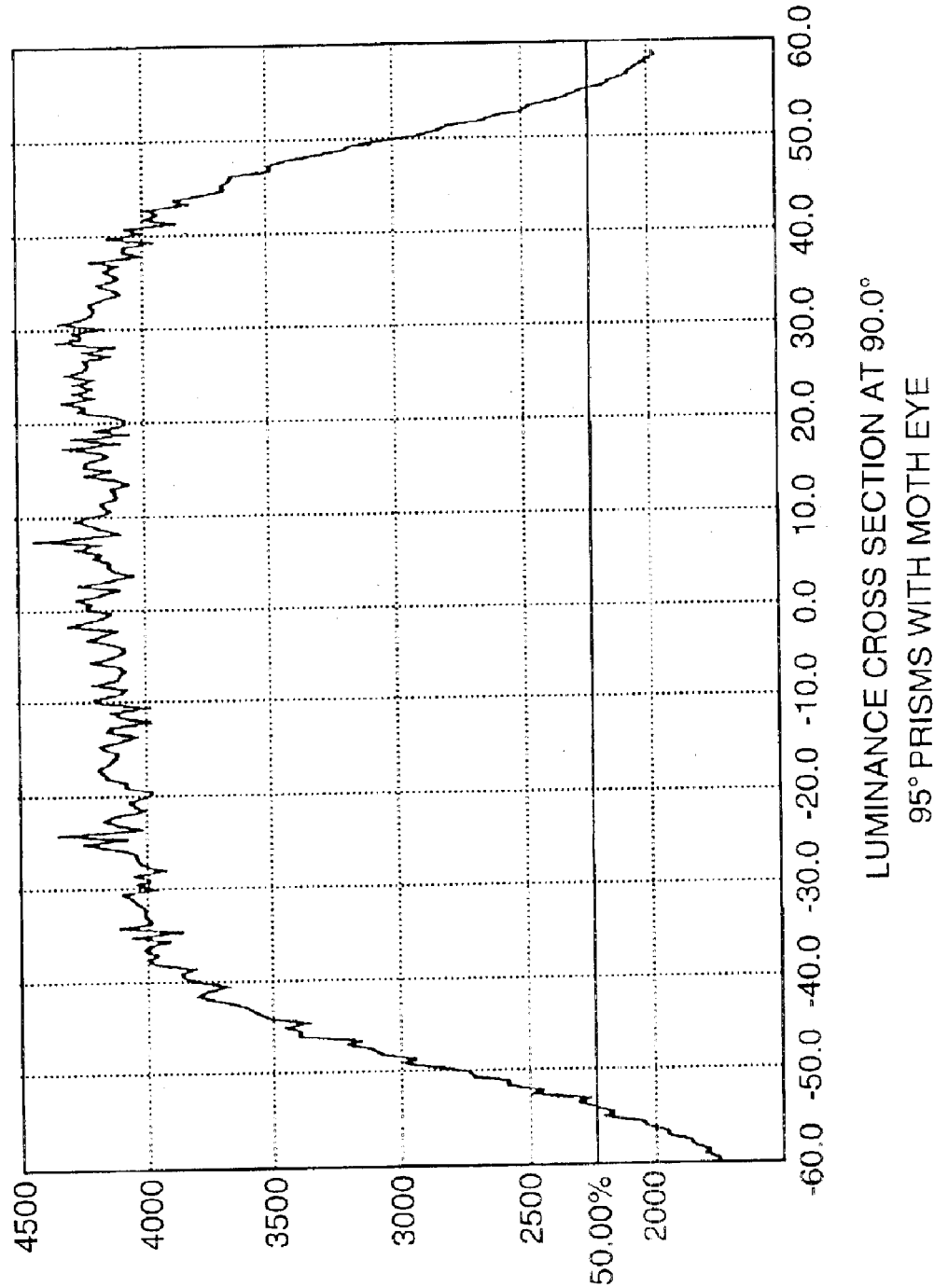
FIG. 27 is a plot of luminance cross section versus observation angle from the normal at 90 degrees orientation of a film with moth-eye structures having a period of about 0.2 μm and a height of about 0.4 μm and linear prisms with a 95 degree included angle and a pitch of 0.0019 inches (48 μm).
Figure 28:
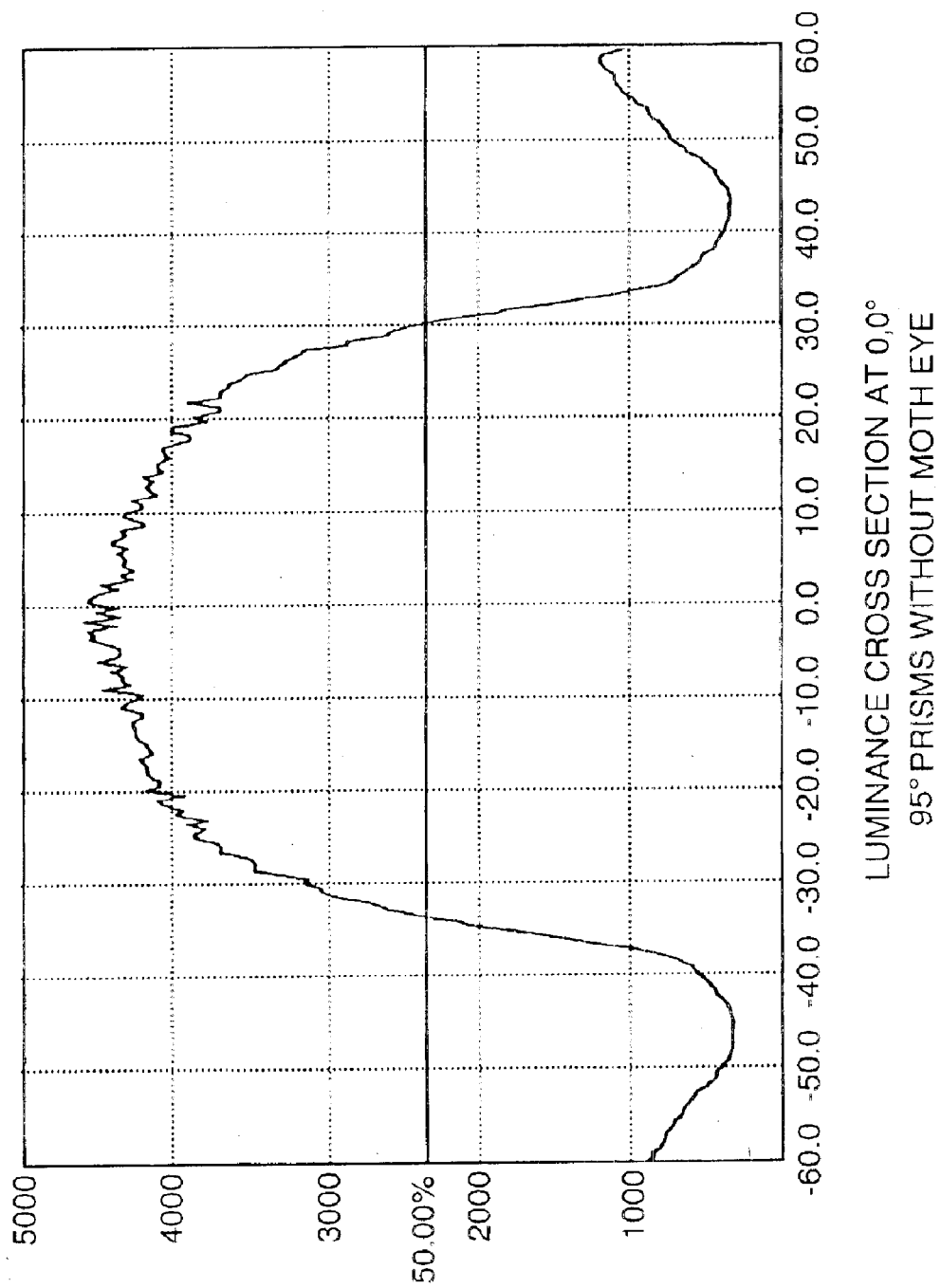
FIG. 28 is a plot of luminance cross section versus observation angle from the normal at zero degree orientation of a film without moth-eye structures and linear prisms with 95 degree included angle and a pitch of 0.0019 inches (48 μm).
Figure 29:
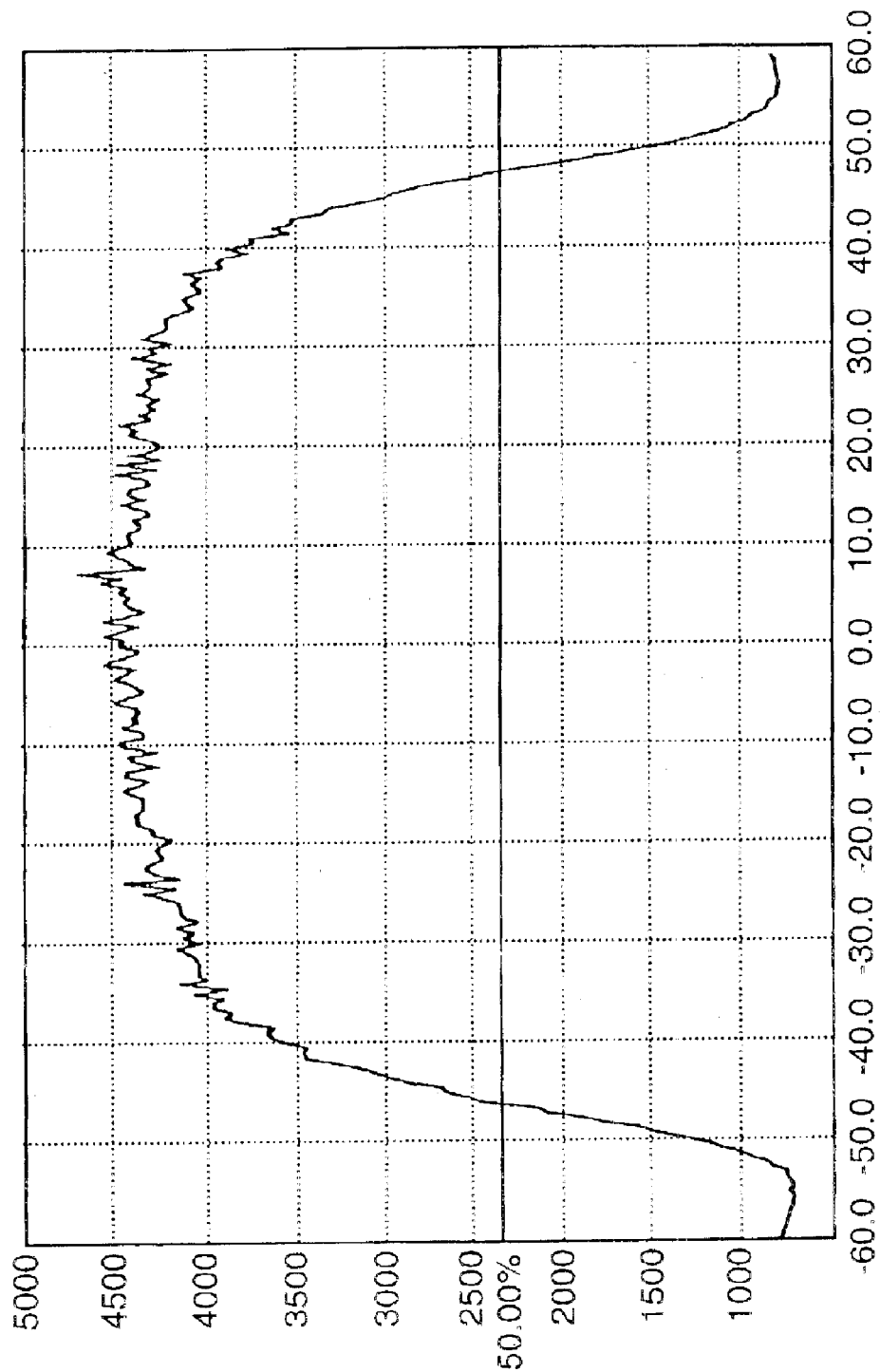
FIG. 29 is a plot of luminance cross section versus observation angle from the normal at zero degree orientation of a film without moth-eye structures and linear prisms with 95 degree included angle and a pitch of 0.0019 inches (48 μm).

FIGS. 21 and 22 show a plot of the improvement in transmission by wavelength for 0.002 inch (51 μm) thick PET having moth-eye structures on one side and having moth-eye structures on both sides at zero degrees and at 30 degree angles from the normal, respectively. The moth-eye structures have a period of about 0.2 μm and a height of about 0.4 μm. The reference is a uniform light distribution coming from a diffuser positioned above the waveguide. FIG. 23 shows a plot of the improvement in transmission by angle from the normal for 0.002 inch (51 μm) PET with moth-eye structures. In this figure, the fluorescent tube light bulb is at a +80 degree position for the 90 degree orientation. FIG. 24 shows a plot of the color shift which occurs for 0.002 inch (51 μm) thick PET with moth-eye structures on one side and with moth-eye structures on both sides. FIG. 25 shows a plot of the color shift that occurs for 0.004 inch (102 μm) thick PET with 95 degree linear prisms on the side away from the diffuser and with and without moth eye on the side close to the diffuser. For all measurements, the samples were placed on top of the diffuser in a standard LCD back light assembly and the Photon Research detector, Model PR650, was supported eighteen inches (45.7 cm) above the part surface.

The moth-eye structure provides anti-reflection properties to the previously smooth light entrance surface of the substrate even at entrance angles that are near grazing incidence. The moth-eye structure is more effective than standard thin film anti-reflection coatings at wide angles of incidence, especially angles of incidence beyond 30 degrees up to 80 degrees. This characteristic causes many types of optical microstructure films, including linear prism films, to process light very differently than the standard linear prism light-redirecting films that have smooth entrance surfaces with or without standard anti-reflection thin film (vacuum deposited or liquid applied) coatings. The addition of the moth-eye structures helps to more efficiently recycle light and also redirects the normally reflected grazing angle incidence rays into the optical microstructure (such as linear prisms) sheet where the rays are refracted, reflected or retroreflected depending on the respective angles of incidence. This moth-eye improvement concept can be added to many types of brightness enhancement films (BEF). An advantage is that functional optical microstructures can be applied to both sides of a film or substrate.

A moth-eye anti-reflection surface is one in which the reflection of light is reduced by the presence of a regular array of small protuberances covering the surface. The spacing of the protuberances is less than the wavelength of light for which anti-reflection is sought. A moth-eye surface can be understood in terms of a surface layer in which the refractive index varies gradually from unity to that of the bulk material. Without such a layer the Fresnel reflection coefficient at an interface of two media is equal to $((n_1-n_2)/(n_1+n_2))^2$, where $n_1$ and $n_2$ are the refractive indices of the media. However, if there is a gradual change of index, net reflectance can be regarded as the result of an infinite series of reflections at each incremental change in index. Since each reflection comes from a different depth from the surface, each has a different phase. If a transition takes place over an optical distance of $\lambda/2$, all phases are present, there is destructive interference and the reflectance falls to zero.

When the height of the protuberance (h) is significantly less than the wavelength ($\lambda$), the interface appears relatively sharp and the reflectance is essentially that of a discontinuous boundary. As the ratio of $h/\lambda$ increases, the reflectance decreases to a minimum value at about $h/\lambda=0.4$. Further increases in $h/\lambda$ show a series of successive maxima and minima, but the value does not again approach that of a sharp interface. The details of the curve shown in FIG. 20 vary depending on the profile of the change of the index of refraction, but if the thickness is of the order of half a wavelength or more the reflectance is considerably reduced. The spacing of the protuberances should be sufficiently fine to avoid losses by diffraction. Preferably, it should be less than the shortest wavelength involved divided by the refractive index of the material.

It is important that the spacing d between the peaks of the protuberances on the moth-eye surface is sufficiently small that the array cannot be resolved by incident light. If this is not the case, the array can act as a diffraction grating and, although there may well be a reduction in the specular reflection (zero order), the light is simply redistributed into the diffracted orders. In other words, we require that $d<\lambda$ for normal incidence and $d<\lambda/2$ for oblique incidence if for reflection only, and that $d<\lambda/2n$ in the case of transmission where diffraction inside the material is suppressed.

For a given moth-eye surface, where the height of the protuberances is h and the spacing is d, the reflectance is expected to be very low for wavelengths less than about 2.5h and greater than d at normal incidence, and for wavelengths greater than 2d for oblique incidence. Preferably, the spacing is as close as possible, and the depth as great as possible, in order to give the widest possible bandwidth. For example, a h/d ratio is preferably about three.

The moth-eye effect should not be confused with that of reducing the specular reflectance by roughening. Roughness merely redistributes the reflected light as diffuse scattering and degrades the transmitted wavefront. With the moth-eye structure, there is no increase in diffuse scattering, the transmitted wavefront is not degraded, and the reduction in reflection gives rise to a corresponding increase in transmission.

The moth-eye structure has many advantages. There is no extra coating process necessary. The structure can be transferred to the sheet by a pressure molding process, such as with a Fresnel structure. The reflection reduction does not depend on the wavelength. There is only a lower limit (on the ultraviolet side of the spectrum) set by the structure period. If the wavelength is too small compared to the period, the light is diffracted. In regard to angular dependence, with conventional anti-reflective coatings, the transmission curve shifts with the light incidence angle. With the moth-eye structure, the critical wavelength for diffraction shifts to higher values, but there are no changes above this wavelength. Another advantage for moth-eye structures is that there are no adhesion problems between lens and gradient layer because it can be one bulk material. From a high incident angle, the surfaces can appear blue or violet.

To form a moth-eye structure, the structure is first produced on a photoresist-covered glass substrate by a holographic exposure using an ultraviolet laser. A suitable device is available from Holographic Lithography Systems of Bedford, Mass. 01730. An example of a method is disclosed in U.S. Pat. No. 4,013,465, issued to Clapham et al. on Mar. 22, 1977, the teachings of which are incorporated herein by reference. This method is sensitive to any changes in the environment, such as temperature and dust, and care must taken. The structure is then transferred to a nickel shim by an electroforming process. In a preferred embodiment, the shims are about 300 micrometers thick or less.

The moth-eye structures can be made one dimensional in a grating type pattern. In this embodiment, the structure has a nearly rectangular profile, which means they have no gradient layers, but more of a one layer anti-reflective coating with a lowered refractive index in the structure region. Control of the grating depth is important as is control of thickness for the evaporated layers. Control of depth and thickness is achieved by maintaining uniformity of beam exposure, substrate flatness, and exposure time.

A two-dimensional structure is formed by two exposures with a linear sinus-grid, turned by 90 degrees for the second exposure. A third type of structure is formed by three exposures with turns of 60 degrees to provide a hexagonal or honeycomb shape.

When measured at a four inch (10.2 cm) distance from the display Photon Research Model No. PR650, the results with two 95 degree linear prism films each having a moth-eye structure on the previously smooth side show about the same brightness on axis as two 90 degree BEF films, a large improvement in brightness off axis in both vertical and horizontal axis and a warmer color to the light emerging from the display. In FIGS. 26, 27, 28 and 29, the total integrated light intensity for the 95 degree prisms with moth-eye structure films is 6,686.8 lm/m² with a maximum of 4,460 cd/m² and a minimum of 554.0 cd/m². For the 90 degree prisms without moth-eye structure films, the integrated light intensity is 5,698.8 lm/m$^2$ with a maximum of 4,685.0 cd/M$^2$ and a minimum of 295.9 cd/m$^2$.

Through analysis and experimental results, a preferred embodiment includes a 75 degree linear prism film that can be used as the first layer above a uniform light output diffuser to collimate the light to about a +/−30 degree angle. The prism grooves in this first layer are oriented parallel to the light source that illuminates the waveguide that is below the diffuser. On top of this film can be a 95 degree linear prism film that is oriented at 90 degrees with respect to the 75 degree film to collimate the light to about +/−25 degrees with a small percentage of the light at +/−30 degrees, as shown in FIGS. 10, 11, 16 and 17. The final intensity of the collimated light is excellent and comparable to results obtained with two crossed 90 degrees BEF films, as shown in FIGS. 8, 9, 14 and 15. These 90 degree BEF films do not allow for the recycled component (Note that there is no recycled light with the 75 degree film) but, allowing for the recycled light, the peak intensities become 2.15 for the 75 degree plus 95 degree light-redirecting films and 2.06 for the BEF films. The prism apex angle of the second 95 degree film can be increased to about 100 degrees if the spread in the collimated light beam is too narrow.

Figure 30:
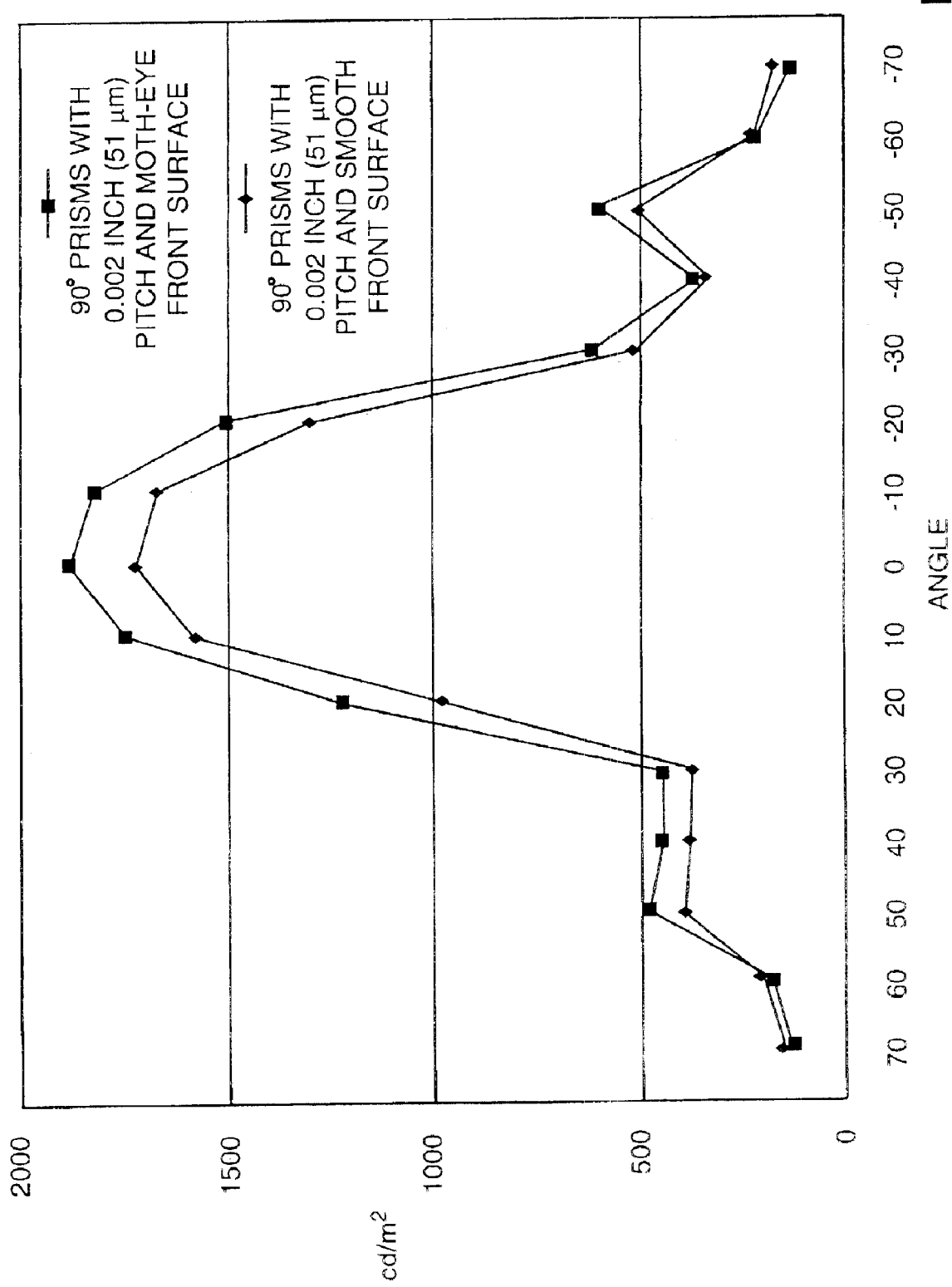
FIG. 30 shows a plot of light transmission versus angle from the normal of a film with 90 degree linear prisms having a pitch of 0.002 inches (51 μm) with and without moth-eye structures on the window side of the films.

FIG. 30 shows a comparative plot of light transmission versus angle from the normal of a film with 90 degree linear prisms having a pitch of 0.002 inches (51 μm) with moth-eye structures on the window side of the film and a film with 90 degree linear prisms having a pitch of 0.002 inches (51 μm) without moth-eye structures on the side of the film. The comparative plot shows a substantial improvement in transmission, particularly at zero degrees, when employing a moth-eye structure on the window side of the film as compared to a similar film without a moth-eye structure.

While this invention has been particularly shown and described with references to preferred embodiments thereof, it will be understood by those skilled in the art that various changes in form and details may be made therein without departing from the scope of the invention encompassed by the appended claims.

What is claimed is:

1. A waveguide for use in a back lighting display device, the waveguide having a moth-eye structured surface thereon.

2. The waveguide of claim 1, wherein the waveguide is wedge-shaped.

3. The waveguide of claim 1, wherein the waveguide is configured to be implemented in a back lighting system.

4. A back lighting system, comprising;
   a lighting device;
   a display panel; and
   a waveguide for redirecting light generated by the lighting device toward the display panel, the waveguide including a plurality of moth-eye structures on at least one surface thereof.

5. The back lighting system of claim 4, further comprising a first light-redirecting film positioned between the waveguide and the display panel.

6. The back lighting system of claim 5, wherein the first light-redirecting film includes a plurality of moth-eye structures on a first side of the first light-redirecting film.

7. The back lighting system of claim 6, wherein the moth-eye structures face the waveguide.

8. The back lighting system of claim 6, wherein the moth-eye structures face the display panel.

9. The back lighting system of claim 6, wherein the first light-redirecting film includes a plurality of linear prisms on a second side of the first light-redirecting film, the linear prisms facing the display panel.

10. The back lighting system of claim 5, further comprising a second light-redirecting film positioned between the first light-redirecting film and the display panel.

11. The back lighting system of claim 10, further comprising a diffuser positioned between the second light-redirecting film and the display panel.

12. The back lighting system of claim 10, wherein the second light-redirecting film includes a plurality of moth-eye structures on a first side of the second light-redirecting film, the moth-eye structures facing the first light-redirecting film.

13. The back lighting system of claim 12, wherein the second light-redirecting film includes a plurality of linear prisms on a second side of the second light-redirecting film, the linear prisms facing the display device.

14. The back lighting system of claim 5, further comprising a diffuser positioned between the first light-redirecting film and the waveguide.

15. The back lighting system of claim 5, further comprising a diffuser positioned between the first light-redirecting film and the display panel.

16. The back lighting system of claim 4, further comprising a reflector for redirecting light toward the waveguide.

17. A light-redirecting film comprising a sheeting having a plurality of prisms on a first side of the film, and a plurality of moth-eye structures on a second side of the film.

18. The light-redirecting film of claim 17, wherein the prisms include linear prisms.

19. The light-redirecting film of claim 18, wherein the moth-eye structures include linear moth-eye structures.

20. An optical structure, comprising:
   a) a first light-redirecting film having a first surface with a plurality of linear moth-eye structures thereon and a second surface with first linear prisms having peaks; and
   b) a second light-redirecting film having a first surface with a plurality of linear moth-eye structures thereon and a second surface with second linear prisms having peaks.

21. The optical structure of claim 20, further comprising an abrasion reduction layer positioned between the first and second light-redirecting films.

22. The optical structure of claim 20, further comprising a waveguide positioned adjacent to the first light-redirecting film, the waveguide including a moth-eye structured surface.

23. The optical structure of claim 22, further comprising a diffuser positioned between the first light-redirecting film and the waveguide.

24. The optical structure of claim 20, wherein the linear moth-eye structures of the first light-redirecting film are oriented at about ninety degrees relative to the peaks of the first linear prisms.

25. The optical structure of claim 20, wherein the linear moth-eye structures of the second light-redirecting film are oriented at about ninety degrees relative to the peaks of the second linear prisms.

26. The optical structure of claim 20, further comprising a diffuser positioned between the second light-redirecting layer and the display panel.

27. The optical structure of claim 20, wherein the linear moth-eye structures of the second film are substantially parallel to the peaks of the linear prisms of the first film.

28. The optical structure of claim 20, wherein the linear moth-eye structures of the second film are substantially perpendicular to the peaks of the linear prisms of the first film.

29. The optical structure of claim 20, wherein the linear moth-eye structures of the first light-redirecting film are substantially parallel to the peaks of the first linear prisms.

30. The optical structure of claim 20, wherein the linear moth-eye structures of the second light-redirecting film are substantially parallel to the peaks of the second linear prisms.

31. The optical structure of claim 20, wherein the peaks of the first linear prisms are substantially perpendicular to the peaks of the second linear prisms.

32. The optical structure of claim 20, wherein the linear moth-eye structures have a pitch between about 150 and 350 nanometers.

33. An optical structure, comprising:
   a) a first light-redirecting film having a plurality of linear prisms on one side and a moth-eye structured surface on an opposing side; and
   b) a second light-redirecting film having a plurality of linear prisms on one side and a moth-eye structured surface on an opposing side.

34. The optical structure of claim 33, wherein the moth-eye structured surface of the first and second films includes linear moth-eye structures, the moth-eye structures of the first film being about perpendicular to the linear prisms of the first film and the moth-eye structures of the second film being about perpendicular to the linear prisms of the second film.

35. The optical structure of claim 33, wherein the moth-eye structured surface of the first and second films includes linear moth-eye structures, the moth-eye structures of the first film being about parallel to the linear prisms of the first film and the moth-eye structures of the second film being about perpendicular to the linear prisms of the second film.

36. The optical structure of claim 33, wherein the moth-eye structured surface of the first and second films includes linear moth-eye structures, the moth-eye structures of the first film being about perpendicular to the linear prisms of the first film and the moth-eye structures of the second film being about parallel to the linear prisms of the second film.

37. The optical structure of claim 33, wherein the moth-eye structured surface of the first and second films includes linear moth-eye structures, the moth-eye structures of the first film being about parallel to the linear prisms of the first film and the moth-eye structures of the second film being about parallel to the linear prisms of the second film.

38. The backlighting system of claim 10, wherein the second light-redirecting film includes a plurality of prisms tilted in opposite directions.

39. The backlighting system of claim 38, wherein every other prism is tilted in an opposite direction.

40. A light-redirecting film comprising a plurality of prisms having peaks that are about in the same plane, the prisms being tilted in opposite directions.

41. The light-redirecting film of claim 40, wherein every other prism is tilted in a opposite direction.

* * * * *